United States Patent
Van Manen et al.

(10) Patent No.: US 11,029,432 B2
(45) Date of Patent: Jun. 8, 2021

(54) DE-ALIASED SOURCE SEPARATION METHOD

(71) Applicant: SEISMIC APPARITION GmbH, Zurich (CH)

(72) Inventors: Dirk-Jan Van Manen, Otelfingen (CH); Fredrik Andersson, Esloev (SE); Johan Robertsson, Wald (CH); Kurt Eggenberger, Maienfeld (CH)

(73) Assignee: SEISMIC APPARITION GmbH, Zurich (CH)

( * ) Notice: Subject to any disclaimer, the term of this patent is extended or adjusted under 35 U.S.C. 154(b) by 279 days.

(21) Appl. No.: 16/119,728

(22) Filed: Aug. 31, 2018

(65) Prior Publication Data

US 2019/0072686 A1 Mar. 7, 2019

Related U.S. Application Data

(63) Continuation of application No. PCT/IB2017/051616, filed on Mar. 21, 2017.

(30) Foreign Application Priority Data

Mar. 28, 2016 (GB) ..................................... 1605161
Nov. 10, 2016 (GB) ..................................... 1619035

(51) Int. Cl.
*G01V 1/36* (2006.01)
*G01V 1/32* (2006.01)
(Continued)

(52) U.S. Cl.
CPC .............. *G01V 1/36* (2013.01); *G01V 1/005* (2013.01); *G01V 1/325* (2013.01); *G01V 1/364* (2013.01); *G01V 1/3808* (2013.01); *G01V 1/3852* (2013.01); *G01V 1/362* (2013.01); *G01V 2210/121* (2013.01); *G01V 2210/1293* (2013.01); *G01V 2210/1423* (2013.01); *G01V 2210/1427* (2013.01); *G01V 2210/20* (2013.01); *G01V 2210/244* (2013.01);
(Continued)

(58) Field of Classification Search
None
See application file for complete search history.

(56) References Cited

U.S. PATENT DOCUMENTS

2005/0128874 A1* 6/2005 Herkenhoff ............ G01V 1/003
367/56
2009/0168600 A1 7/2009 Moore et al.
(Continued)

OTHER PUBLICATIONS

Biondi (3-D Seismic Imaging, 2005, Stanford University, March) (Year: 2005).*
(Continued)

*Primary Examiner* — Roy Y Yi
(74) *Attorney, Agent, or Firm* — Oblon, McClelland, Maier & Neustadt, L.L.P.

(57) ABSTRACT

Methods are described for separating the unknown contributions of two or more sources from a commonly acquired aliased wave field signals including the determination of models with reduced support in the frequency-wavenumber domain which reconstruct the wave fields of independently-activated sources after a coordinate-transform of the acquired wave field data and/or in a coordinate-transformed domain.

21 Claims, 10 Drawing Sheets

(51) Int. Cl.
*G01V 1/00* (2006.01)
*G01V 1/38* (2006.01)

(52) U.S. Cl.
CPC ...... *G01V 2210/44* (2013.01); *G01V 2210/46* (2013.01); *G01V 2210/47* (2013.01); *G01V 2210/52* (2013.01); *G01V 2210/56* (2013.01)

(56) References Cited

U.S. PATENT DOCUMENTS

| | | | | |
|---|---|---|---|---|
| 2010/0211321 | A1* | 8/2010 | Ozdemir | G01V 1/364 702/14 |
| 2011/0292762 | A1* | 12/2011 | Ozdemir | G01V 1/38 367/24 |
| 2013/0135965 | A1 | 5/2013 | Ji et al. | |
| 2015/0234066 | A1 | 8/2015 | Poole et al. | |

OTHER PUBLICATIONS

International Search Report dated Jun. 20, 2017 in PCT/IB2017/051616, 3 pages.
Shannon, C.E., "Communication in the Presence of Noise", Proceedings of the I.R.E., vol. 37, Jan. 1949, pp. 10-21.
Nyquist, H., "Certain Topics in Telegraph Transmission Theory", Transactions A.I.E.E., Feb. 1928, pp. 617-644.
Abma, R., et al., "Independent Simultaneous Source Acquisition and Processing", Geophysics, vol. 80 No. 6, Nov.-Dec. 2015, pp. WD37-WD44.
Kumar, R., et al., "Source Separation for Simultaneous Towed-Streamer Marine Acquisition—A Compressed Sensing Approach", Geophysics, vol. 80 No. 6, Nov.-Dec. 2015, pp. WD73-WD88.
Mueller, M.B., et al., "The Benefit of Encoded Source Sequences for Simultaneous Source Separation", Geophysics, vol. 80 No. 5, Sep.-Oct. 2015, pp. VI33-VI43.
Robertsson, J.O.A., et al , "Tools and Techniques: Marine Seismic Methods", Geophysics, $2^{nd}$ Edition, vol. 11, 2015, pp. 175-208.
Barnes, A.E., "Another look at NMO Stretch", Geophysics, vol. 57 No. 5, May 1992, pp. 749-751.
Stockwell, R.C., et al., "Localization of the Complex Spectrum: The S Transform", IEEE Transactions on Signal Processing, vol. 44 No. 4, Apr. 1996, pp. 998-1001.
Dragoset, B., et al., "Geophysical Application of Adaptive-Noise Cancellation", $65^{th}$ SEG meeting, Expanded Abstracts, pp. 1389-1392.
Trickett, S.R., "Stretch-free Stacking", SEG Annual Meeting, Society of Exploration Geophysicists, 2003, 4 pages.
Zhang, B., et al., "Nonstretching NMO correction of prestack time-migrated gathers using a matching—pursuit algorithm", Geophysics, vol. 78 No. 1, Jan.-Feb. 2013, pp. U9-U18.
Ikelle, L.T., "Coding and Decoding: Seismic Data: The Concept of Multishooting", Handbook of Geophysical Exploration: Seismic Exploration, Elsevier, vol. 39, 2010, pp. 293-294, 321-324, 337 and 341.
Bracewell, R., "The Fourier Transform & Its Applications", McGraw-Hill Science, 1999, pp. 111-115, and 268-269.

\* cited by examiner

DE-ALIASED SOURCE SEPARATION METHOD

CROSS-REFERENCE TO RELATED APPLICATIONS

This application is a continuation of PCT Application No. PCT/IB2017/051616, filed Mar. 21, 2017, which claims priority to Great Britain Application No. 1605161.7, filed Mar. 28, 2016, and Great Britain Application No. 1619035.7, filed Nov. 10, 2016. The entire contents of the above-identified applications are incorporated herein by reference.

FIELD

The present disclosure relates to methods for separating contributions from two or more different sources in a common set of aliased measured signals representing a wave field, particularly of seismic sources and of sets of aliased recorded and/or aliased processed seismic signals.

DESCRIPTION OF RELATED ART

The current disclosure relates to marine seismic surveying, including in particular marine seismic data acquisition. The general practice of marine seismic surveying is describe below in relation to FIG. 13.

Prospecting for subsurface hydrocarbon deposits (1301) in a marine environment (FIG. 13) is routinely carried out using one or more vessels (1302) towing seismic sources (1303-1305). The one or more vessels can also tow receivers or receivers (1306-1308) can be placed on the seabed 1314.

Seismic sources typically employ a number of so-called airguns (1309-1311) which operate by repeatedly filling up a chamber in the gun with a volume of air using a compressor and releasing the compressed air at suitable chosen times (and depth) into the water column (1312).

The sudden release of compressed air momentarily displaces the seawater, imparting its energy on it, setting up an impulsive pressure wave in the water column propagating away from the source at the speed of sound in water (with a typical value of around ~1500 m/s) (1313).

Upon incidence at the seafloor (or seabed) (1314), the pressure wave is partially transmitted deeper into the subsurface as elastic waves of various types (1315-1317) and partially reflected upwards (1318). The elastic wave energy propagating deeper into the subsurface partitions whenever discontinuities in subsurface material properties occur. The elastic waves in the subsurface are also subject to an-elastic attenuation which reduces the amplitude of the waves depending on the number of cycles or wavelengths.

Some of the energy reflected upwards (1320-1321) is sensed and recorded by suitable receivers placed on the seabed (1306-1308), or towed behind one or more vessels. The receivers, depending on the type, sense and record a variety of quantities associated with the reflected energy, for example, one or more components of the particle displacement, velocity or acceleration vector (using geophones, mems [micro-electromechanical] or other devices, as is well known in the art), or the pressure variations (using hydrophones). The wave field recordings made by the receivers are stored locally in a memory device and/or transmitted over a network for storage and processing by one or more computers.

Waves emitted by the source in the upward direction also reflect downward from the sea surface (1319), which acts as a nearly perfect mirror for acoustic waves.

One seismic source typically consist of one or more airgun arrays (1303-1305): that is, multiple airgun elements (1309-1311) towed in, e.g., a linear configuration spaced apart several meters and at substantially the same depth, whose air is released (near-) simultaneously, typically to increase the amount of energy directed towards (and emitted into) the subsurface.

Seismic acquisition proceeds by the source vessel (1302) sailing along many lines or trajectories (1322) and releasing air from the airguns from one or more source arrays (also known as firing or shooting) once the vessel or arrays reach particular pre-determined positions along the line or trajectory (1323-1325), or, at fixed, pre-determined times or time intervals. In FIG. 13, the source vessel (1302) is shown in three consecutive positions (1323-1325), also called shot positions.

Typically, subsurface reflected waves are recorded with the source vessel occupying and shooting hundreds of shots positions. A combination of many sail-lines (1322) can form, for example, an areal grid of source positions with associated inline source spacings (1326) and crossline source spacings. Receivers can be similarly laid out in one or more lines forming areal configuration with associated inline receiver spacings (1327) and crossline receiver spacings.

A common and long-standing problem in physical wave field experimentation is how to separate recorded signals from two or more simultaneously emitting sources. In particular, for more than a decade, the simultaneous source problem has (arguably) been the most pertinent problem to solve to efficiently acquire data for 3D reflection seismic imaging of complex Earth subsurface structures.

SUMMARY

A method for separating or deblending wave fields generated by two or more sources contributing to a common set of aliased measured or recorded signals are provided suited for seismic applications and other purposes, substantially as shown in and/or described in connection with at least one of the figures, and as set forth more completely in the claims.

Advantages, aspects and novel features of the present disclosure, as well as details of an illustrated embodiment thereof, can be more fully understood from the following description and drawings.

BRIEF DESCRIPTION OF THE DRAWINGS

In the following description reference is made to the attached figures, in which.

DETAILED DESCRIPTION

Figure 1A:
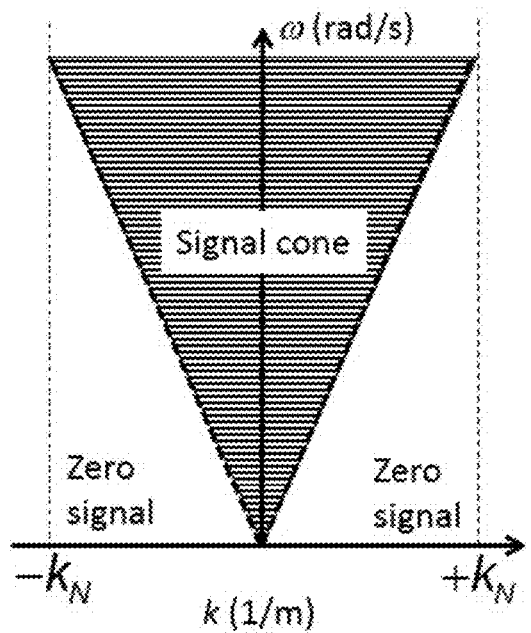
FIGS. 1A and 1B illustrate how in a conventional marine seismic survey all signal energy of two source typically sits inside a "signal cone" bounded by the propagation velocity of the recording medium and how this energy can be split in a transform domain by applying a modulation to the second source.

Simultaneously emitting sources, such that their signals overlap in the (seismic) record, is also known in the industry as "blending." Conversely, separating signals from two or more simultaneously emitting sources is also known as "de-blending". The data from such acquisitions as "blended data."

Modern digital data processing of wave fields (or signals) uses a discretized version of the original wave field, say g, that is obtained by sampling g on a discrete set. The NyquistShannon sampling theorem shows how g can be recovered from its samples; for an infinite number of equidistant samples and given sample rate $k_s$, perfect reconstruction is guaranteed provided that the underlying signal was bandlimited to $|k| \leq k_N = k_s/2$ (Shannon, 1949; Nyquist, 1928), where $k_N$ is the so-called Nyquist wavenumber. The NyquistShannon sampling theorem is equally relevant both to signals generated from a single source being recorded on multiple receivers (receiver-side sampling) as well as signals generated from multiple sources and recorded at a single receiver (source-side sampling).

Assume that the wave field g is measured at a specific recording location for a source that is excited at different source positions along a straight line. The sampling theorem then dictates how the source locations must be sampled for a given frequency of the source and phase velocity of the wave field. One aspect of the sampling problem is as follows. Consider that instead of using one source, one wants to use two (or more) sources to for instance increase the rate at which data can be acquired. The second source is triggered simultaneously or close in time with the first source while moving along another arbitrarily oriented line to excite the wave field h. At the recording location the wave fields interfere and the sum of the two wave fields, f=g+h, is measured. There is no known published exact solution to perfectly separate the wave fields g and h that were produced from each source from the combined measurement f (e.g., see Ikelle, 2010; Abma et al., 2015; Kumar et al, 2015; Mueller et al., 2015).

It can therefore be seen as an object of the disclosure, to present new and/or improved methods for generating source-separated data for simultaneous-source acquired data, particularly, including methods that are robust with respect to aliasing effects in the acquired data.

The following examples can be better understood using a theoretical overview as presented below.

The slowest observable (apparent) velocity of a signal along a line of recordings in any kind of wave experimentation is identical to the slowest physical propagation velocity in the medium where the recordings are made. As a result, after a spatial and temporal Fourier transform, large parts of the frequency-wavenumber ($\omega$k) spectrum inside the Nyquist frequency and wavenumber tend to be empty. In particular, for marine reflection seismic data (Robertsson et al., 2015), the slowest observable velocity of arrivals corresponds to the propagation velocity in water (around 1500 m/s).

FIG. 1A illustrates how all signal energy when represented in or transformed into the frequency-wavenumber ($\omega$k) domain sits inside a "signal cone" centered at k=0 and bounded by the propagation velocity of the recording medium.

It is well known, for example, that due to the "uncertainty principle", a function and its Fourier transform cannot both have bounded support. As (seismic) data are necessarily acquired over a finite spatial (and temporal) extent, the terms "bounded support" and "limited support" herein are used not in the strict mathematical sense, but rather to describe an "effective numerical support", that can be characterised, e.g., by the (amplitude) spectrum being larger than a certain value. For instance, larger than a certain noise threshold, or larger than the quantization error of the analog-to-digital converters used in the measurement equipment. Further, it is understood that by explicitly windowing space and/or space-time domain data, the support of a function can be spread over a larger region of, e.g., the wavenumber-frequency domain and in such cases the term "bounded support" and "limited support" will also be understood as "effective numerical support" as it will still be possible to apply the methods described herein.

Furthermore, the terms "cone" and "cone-shaped" used herein are used to indicate the shape of the "bounded" or "effective numerical" support of the data of interest (e.g., the data that would be recorded firing the sources individually [i.e. non-simultaneously]) in the frequency-wavenumber domain. In many cases, it will still be possible to apply the methods described herein if the actual support is approximately conic or approximately cone-shaped. For example, at certain frequencies or across certain frequency ranges the support could be locally wider or less wide than strictly defined by a cone. Such variations are contemplated and within the scope of the appended claims. That is, the terms "cone" and "cone-shaped" should be understood to include approximately conic and approximately cone-shaped. In addition, in some cases we use the terms "bounded support" or "limited support" and "effective numerical support" to refer to data with "conic support" or "cone-shaped support" even though in the strict mathematical sense a "cone" is not bounded (as it extends to infinite temporal frequency). In such cases, the "boundedness" should be understood to refer to the support of the data along the wavenumber axis/axes, whereas "conic" refers to the overall shape of the support in the frequency-wavenumber domain.

Note that the term "cone-shaped support" or similar refers to the shape of the support of e.g. the data of interest (in the frequency-wavenumber domain), if it were regularly sampled along a linear trajectory in 2D or Cartesian grid in 3D. That is, it refers only to the existence of such a support and not to the actual observed support of the data of interest in the simultaneous source input data or of the separated data of interest sampled as desired. The support of both of these depends on the chosen regularly or irregularly sampled straight or curved input (activation) and output (separation) lines or grids. Such variations are within the scope of the appended claims.

For example consider a case where the input data are acquired using simultaneous curved shot lines. In this case, the methods described herein can either be applied directly to the input data, provided the curvature has not widened the support of the data interest such that it significantly overlaps with itself. In this case, the support used in the methods described herein can be different from cone-shaped. Alternatively, the methods described herein are used to reconstruct the data of interest in a transform domain which corresponds to, e.g., best-fitting regularly sampled and/or straight activation lines or Cartesian grids, followed by computing the separated data of interest in the non-transformed domain at desired regular or irregularly sampled locations.

In a wave field experiment it can be that a source is excited sequentially for multiple source locations along a line while recording the reflected wave field on at least one receiver. The source can be characterized by its temporal signature. In the conventional way of acquiring signals representing a wave field the source can be excited using the same signature from source location to source location, denoted by integer n. Next, consider the alternative way of acquiring such a line of data using a periodic sequence of source signatures: every second source can have a constant signature and every other second source can have a signature which can for example be a scaled or filtered function of the first source signature. Let this scaling or convolution filter be denoted by a(t), with frequency-domain transform $A(\omega)$. Analyzed in the frequency domain, using for example a receiver gather (one receiver station measuring the response from a sequence of sources) recorded in this way, can be constructed from the following modulating function m(n) applied to a conventionally sampled and recorded set of wave field signals:

$$m(n) = \frac{1}{2}[1 + (-1)^n] + \frac{1}{2}A[1 - (-1)^n],$$

which can also be written as $$m(n) = \frac{1}{2}[1 + e^{i\pi n}] + \frac{1}{2}A[1 - e^{i\pi n}]. \quad (0.1)$$

By applying the function m in Eq. 0.1 as a modulating function to data $f(n)$ before taking a discrete Fourier transform in space (over n), $F(k)=\mathcal{F}(f(n))$, the following result can be obtained:

$$\mathcal{F}(f(n)m(n)) = \frac{1+A}{2}F(k) + \frac{1-A}{2}F(k - k_N), \quad (0.2)$$

which follows from a standard Fourier transform result (wavenumber shift) (Bracewell, 1999).

Figure 1B:
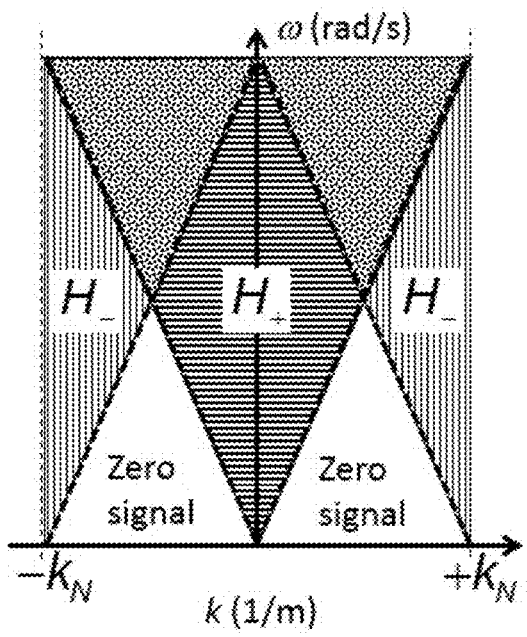

Eq. 0.2 shows that the recorded data f will be scaled and replicated into two places in the spectral domain as illustrated in FIG. 1B and as quantified in Tab. I for different choices of A ($\omega$).

TABLE I

Mapping of signal to cone centered at k = 0 ($H_+$)
and cone centered at k = $k_N$ ($H_-$) for different
choices of A($\omega$) for signal separation or signal apparition in Eq. (0.2).

| A($\omega$) | $H_-$ = (1 − A)/2 | $H_+$ = (1 + A)/2 |
|---|---|---|
| 1 | 0 | 1 |
| −1 | 1 | 0 |
| 0 | ½ | ½ |
| ½ | ¼ | ¾ |
| $e^{i\omega T}$ | $(1 - e^{i\omega T})/2$ | $(1 + e^{i\omega T})/2$ |
| $1 + e^{i\omega T}$ | $-e^{i\omega T}/2$ | $1 + e^{i\omega T}/2$ |

Part of the data will remain at the signal cone centered around k=0 (denoted by $H_+$ in FIG. 1B) and part of the data will be scaled and replicated to a signal cone centered around $k_N$ (denoted by $H_-$). It can be observed that by only knowing one of these parts of the data it is possible to predict the other.

A particular application of interest that can be solved by using the result in Eq. (0.2) is that of simultaneous source separation. Assume that a first source with constant signature is moved along an essentially straight line with uniform sampling of the source locations where it generates the wave field g. Along another essentially straight line a second source is also moved with uniform sampling. Its signature is varied for every second source location according to the simple deterministic modulating sequence m(n), generating the wave field h. The summed, interfering data f=g+h are recorded at a receiver location.

In the frequency-wavenumber domain, where the recorded data are denoted by F=G+H, the H-part is partitioned into two components $H_+$ and $H_-$ with $H=H_+ +H_-$ where the $H_-$-component is nearly "ghostly apparent" and isolated around the Nyquist-wavenumber [FIG. 1B], whereas G and $H_+$ are overlapping wave fields around k=0.

Furthermore, H_ is a known, scaled function of H. The scaling depends on the chosen A(ω) function (Tab. I), and can be deterministically removed, thereby producing the full appearance of the transformed wave field H. When H is found, then G=F−H yielding the separate wave fields g and h in the time-space domain.

Although the above description has focused on acquisition along essentially straight lines, the methodology applies equally well to curved trajectories such as coil-shaped trajectories, circles, or other smoothly varying trajectories or sequences of source activations.

The concept can be extended to the simultaneous acquisition of more than two source lines by choosing different modulation functions for each source.

Acquiring a source line where the first two source locations have the same signature, followed by two with two again with the same signature but modified from the previous two by the function A(ω) and then repeating the pattern again until the full source line has been acquired, will generate additional signal cones centered around $\pm k_N/2$.

This process can be referred to as "wave field apparition" or "signal apparition" in the meaning of "the act of becoming visible". In the spectral domain, the wave field caused by the periodic source sequence is nearly "ghostly apparent" and isolated.

FIG. 1B also illustrates a possible limitation of signal apparition. The $H_+$ and $H_-$ parts are separated within the respective lozenge-shaped regions in FIG. 1B. In the tri-angle-shaped parts they interfere and can no longer be separately predicted without further assumptions. In the example shown in FIG. 1B, it can therefore be noted that the maximum non-aliased frequency for a certain spatial sampling is reduced by a factor of two after applying signal apparition. Assuming that data are adequately sampled, the method nevertheless enables full separation of data recorded in wave field experimentation where two source lines are acquired simultaneously.

As is evident from Tab. I, the special case A=1 corresponds to regular acquisition and thus produces no signal apparition. Obviously, it is advantageous to choose A significantly different from unity so that signal apparition becomes significant and above noise levels. The case where A=−1 (acquisition of data where the source signature flips polarity between source locations) can appear to be the optimal choice as it fully shifts all energy from k=0 to $k_N$ (Bracewell, 1999). Although this is a valid choice for modeling, it is not practical for many applications (e.g., for marine air gun sources, see Robertsson et al., 2015) as it requires the ability to flip polarity of the source signal. The case where A=0 (source excited every second time only) can be a straightforward way to acquire simultaneous source data but has the limitation of reduced sub-surface illumination. A particularly attractive choice of A(ω) for wave experimentation seems to let every second source be excited a time shift T later compared to neighbouring recordings, that is, select $A=e^{i\omega T}$.

The above description assumes a simple modulating sequence m(n), and thus generating the wave field h. In practice it is difficult to obtain perfectly periodic time shifts from a measurement setup. It is for example common practice for seismic vessels to shoot or trigger their sources at predetermined (essentially equidistant) positions, and due to practical variations (vessel velocity etc.) it will be difficult to realize shots at both predetermined locations and times.

Deviations from perfectly periodic acquisition can be termed non-periodic and grouped into non-periodic controlled (or intentional) and non-periodic uncontrolled cases (such as caused by currents, rough seas, etc., which are beyond influence by the acquisition crew). Furthermore, non-periodic acquisition can be composed of a periodic part, overlain by a non-periodic part. In all these cases, the signal cone will be scaled and replicated additional times along the wavenumber axis and the effects can be dealt with by various methods, including modelling and inverting such scaled replications using cyclic convolution functions as described in more detail later.

Note that periodic or aperiodic variations in source locations can similarly be used to apparate the wave field signals. This can be understood for example by noting that a variation in the source location produces (angle-dependent) time shifts and therefore can be used to encode the data using the apparition methods described above.

For a sub-horizontally layered Earth, the recorded reflections from the interfaces between the strata lie (approximately) on hyperbolic trajectories in the space-time domain. The change in two-way traveltime of such reflections as a function of the source-receiver distance (or offset) is known as the normal moveout (NMO) and depends on the zero-offset two-way traveltime and the corresponding average sound speed in the overlying strata.

Correction of the normal moveout (NMO correction) is a standard procedure in seismic data processing which aims to remove the offset dependent part of the traveltime and align the reflected arrivals according to their zero-offset traveltime such that they can be summed yielding an initial "stack image" of the subsurface with increased signal-to-noise ratio.

NMO correction is a very efficient way to reduce the maximum time-dip in the recorded data. On the other hand NMO correction tends to stretch the data at large offsets and at early times, effectively changing (lowering) the frequency content in a space- and time-dependent manner. Let us consider the effect of NMO correction on simultaneous source data that have been acquired using e.g. seismic apparition, or similar, principles.

Because of the stretch, it follows that the NMO correction also modifies the apparition encoding filters a(t) in an offset- and time-dependent manner. However, note that such effects can be accurately predicted or modelled either from theory and first principles and/or numerical experiments. For example, if the encoding filters used were pure time delays, then the time delay after NMO correction can be predicted accurately by multiplying with an expression for NMO stretch due to Barnes (1992):

$$\beta = \frac{t_x}{t_0 - \frac{x^2 v'(t_0)}{v^3(t_0)}} \quad (0.3)$$

where $$t_x = \sqrt{t_0^2 - \frac{x^2}{v_{rms}^2(t_0)}}$$

Alternatively, the space-time dependent effect of the NMO correction on encoding filters can be considered by evaluating the effect of NMO correction at $t_0$ on a discrete delta function $\delta(t-t_x)$ and on $a(t)*\delta(t-t_x)$, respectively, and computing, e.g., the ratio of the resulting responses in the frequency domain. This yields a time- and offset-dependent frequency filter which can be used to predict the effective modulation function (also time- and offset dependent in general) after NMO correction.

Thus, an effective modulation function takes into account, e.g., the space-time dependent effects of the NMO correction, or any other coordinate transform, on the encoding filters.

The well-known convolution theorem states that convolution in the time or space domain corresponds to multiplication in the temporal frequency or spatial frequency domain, respectively. The lesser-known dual of the convolution theorem states that multiplication in the space domain of d(n) with a so-called modulation operator m(n), corresponds to cyclic convolution of the (discrete) Fourier transform of the data, D(k), with the (discrete) Fourier transform of the modulation operator M(k)=$\mathcal{F}$(m(n)), followed by inverse (discrete) Fourier transform. Further, we note that cyclic convolution can be implemented conveniently as a matrix multiplication or using computationally fast methods such as the fast Fourier transform (FFT).

Thus, for general aperiodic modulation functions, the recorded simultaneous source data can be modelled in the frequency-wavenumber domain as the sum of the fk-domain wave fields due to the individual sources, multiplied by one or more corresponding cyclic convolution matrices. Then, the fk-domain wave fields due to the individual sources can be obtained by inverting the data through the model. Note that in this context, here and elsewhere, setting up and solving a system of equations can equally be understood as modelling and inversion, respectively.

Note that the effect of a general aperiodic modulation as compared to a periodic modulation can thus be understood as introducing additional, scaled replications (beyond the replications at (multiples of) +/−Nyquist horizontal wavenumber) of the individual signal cones of the sources, which describe the known to be compact support of the sources, along the wavenumber axis/axes. Both the position and the scaling factor of the replications then are exactly given by the (discrete) Fourier transform of the aperiodic modulation function.

Finally, the S-transform (Stockwell, 1996) decomposes a time-signal into a time-frequency representation, localizing signals in both time and frequency. It provides a frequency-dependent resolution in accordance with the uncertainty principle while maintaining a direct relationship with the Fourier spectrum.

It is possible, then, to use the cyclic convolution principle in conjunction with the S-transform (or similar time-frequency decomposition) and NMO correction to improve the separation of aliased simultaneous source data, acquired, e.g., using seismic apparition principles, in the following manner:

1. NMO correct the (partially) aliased simultaneous source recordings using an invertible NMO transform, effectively reducing the maximum time-dip in the data.
2. Compute the S-transform of each NMO corrected simultaneous source trace. The resulting time-frequency representation implies a frequency spectrum for every time sample of every trace.
3. Iterate over all time samples of the S-transformed NMO-corrected sim source traces. For every time sample:
   a. Compute the offset (and current time) dependent effect of NMO stretch on the encoding filters using, e.g., Eq. 0.3 from Barnes (1992), providing the frequency spectrum of the effective encoding filters.
   b. Loop over all the (positive/negative) frequencies. For every frequency do:
      i. Compute the wavenumber transform of the S-transformed NMO-corrected simultaneous source data at the current time sample and frequency.
      ii. Compute the wavenumber transform of the effective modulation function.
      iii. Using the cyclic convolution principle and the computed wavenumber transform of the effective modulation function, compute a forward modelling operator that relates the source one and source two contributions at the current time sample and frequency to the corresponding sim source data.
      iv. Invert the sim source data at the current time sample and current frequency using the forward modelling operator.
      v. Compute the inverse wavenumber transform of the inverted source one and source two contributions and store the results.
   c. Optional (if all the frequencies are computed): Compute the negative frequencies from the positive frequencies using complex conjugate mirroring.
   d. Store the separated frequency spectra for the current time-step building the S-transforms of the separated data one time sample by one.
4. Inverse S-transform the obtained S-transform data for source one and source two, obtaining the NMO corrected separated source one and source two data.
5. Inverse NMO correct separated s1 and s2 data.

The list of steps is merely illustrative and corresponds to one of many alternative embodiments, as will be apparent to someone ordinarily skilled in the art.

Figure 2:
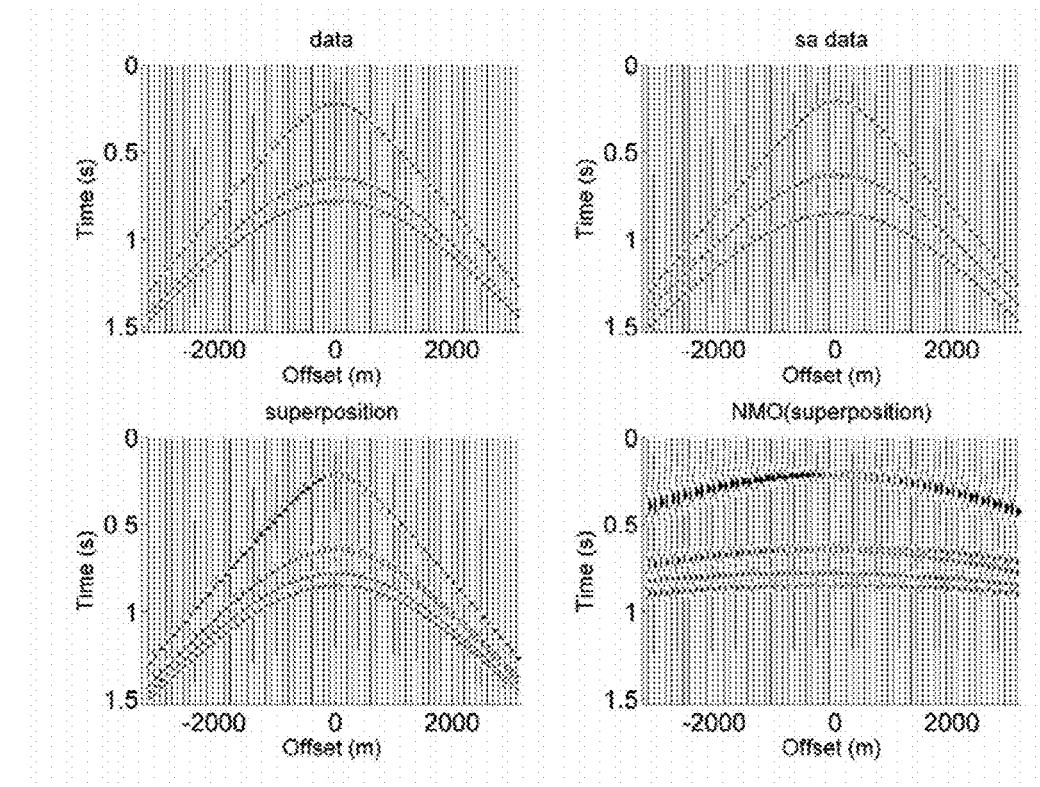
FIG. 2 shows the synthetic data used to illustrate a first method to improve the separation of aliased simultaneous source data. In the top left, the data corresponding to a first source are shown. In the top right, the data corresponding to a second source are shown, where every $2^{nd}$ shot of the second source is fired with a constant time delay. The resulting simultaneous source data (i.e. superposition of top left and top right plots) is shown in the bottom left. The bottom right shows the NMO corrected sim source data.
Figure 3:
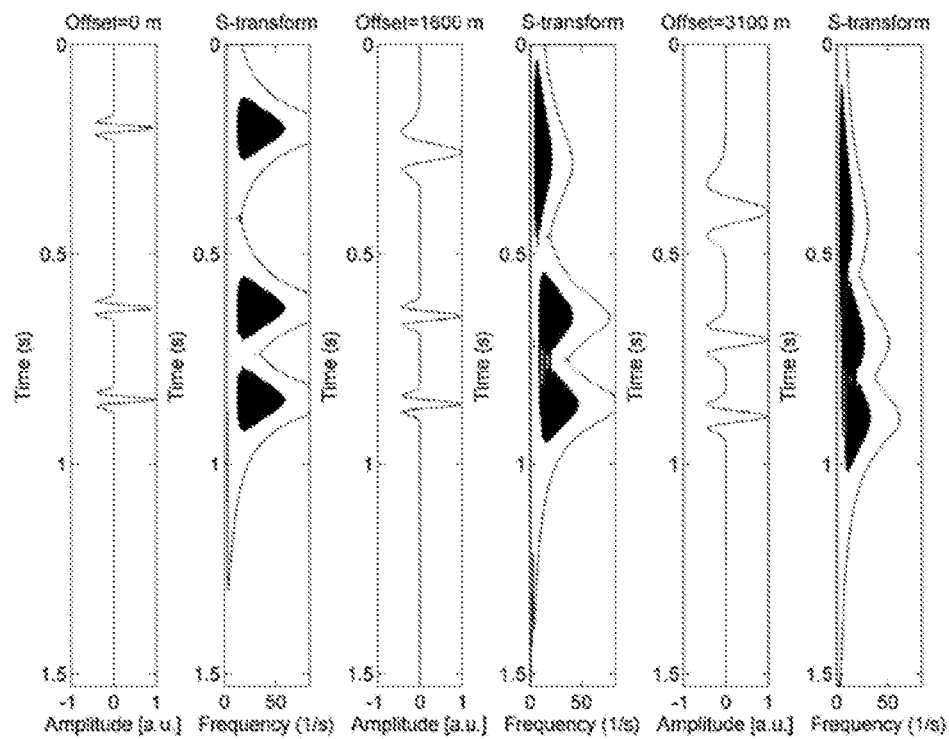
FIG. 3 shows three NMO-corrected traces at zero, mid and far offset and their corresponding S-transforms. The effect of the time and offset dependent stretch is clearly visible and resolved in the S-transforms as a reduced frequency content at early times and large offsets.
Figure 4:
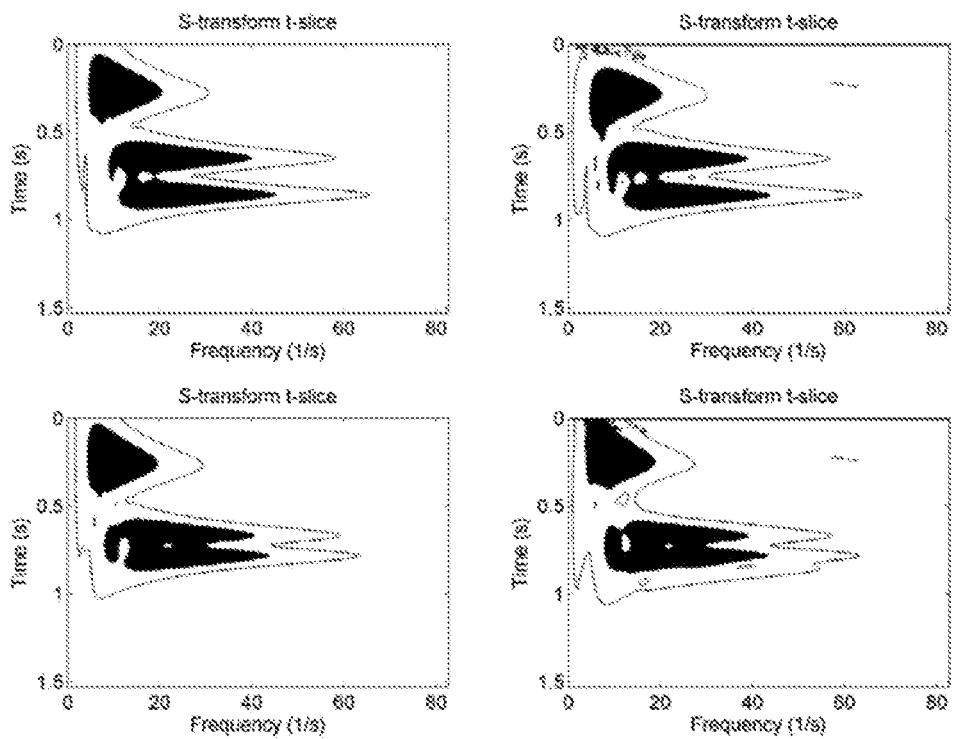
FIG. 4 compares the inverted (separated) source one S-transform data for a single trace (top) and, similarly, for source two (bottom)

In FIGS. 2-4, the workflow described above is demonstrated on NMO corrected aliased data. The effect of the NMO correction is visible in FIGS. 2 and 3 as a time- and offset-dependent stretch. As a result of this time and offset-dependent stretch, the constant time delays (for every $2^{nd}$ trace) are transformed into non-constant, time-varying effective time delays. As described in the workflow, each of the NMO-corrected traces is transformed into a corresponding time-frequency representation using the S-transform. The time-frequency representations of three traces are shown in FIG. 3. Note that the effect of the stretch can be seen as a lowering of the frequency content especially at early times and large (absolute) offsets. The effective time delay after NMO correction is computed using Eq. 0.3 for NMO stretch [due to Barnes (1992)] by multiplying the original time-delay with the time- and offset varying stretch factor. The S-transform data (frequency spectra) for each time sample are then modelled and inverted using the technique described above involving the wavenumber transform of effective modulation function and, implicitly or explicitly, corresponding cyclic convolution matrices. In this way, the S-transforms of the separated data can be built. The inverted S-transform data for one of the offsets are shown in FIG. 4. Similar results are obtained for the other offsets. The S-transform data for sources 1 and 2 can then be inverse transformed to the space time domain and the inverse NMO correction applied to finally give the separated source 1 and source 2 data in the non-stretched space-time domain.

The NMO is a coordinate transformation that reduces the spatial bandwidth of the recorded data, and therefore limiting the effect of aliasing. We now proceed to discuss methods that use other coordinate transformations, and also how several coordinate transformations can be used simultaneously. Moreover, we also discuss how to make reconstruction in two steps: First by making partial reconstructions, using only the non-aliased parts; and secondly to use these partial reconstructions to regularize and solve the full reconstruction problem by means of directionality estimates, that imply local coordinate transformations specifying directions with reduced bandwidth, and hence, reduced aliasing effects.

Let us begin by introducing notation and recapitulating the theory for regular seismic apparition. We will use the notation $$\hat{f}(\xi) = \int_{-\infty}^{\infty} f(x) e^{-2\pi i x \xi} dx,$$

for the Fourier transform in one variable, and consequently $\hat{f}(\omega,\xi)$ for the Fourier transform of two dimensional function $f(t,x)$ with a time (t) and spatial (x) dependence.

Suppose that $f_1=f_1(t,x)$ and $f_2=f_2(t,x)$ are two function with frequency support in two cones of the form $$\frac{\omega^2}{c^2} \geq \xi^2. \tag{1}$$

The constraint comes from assuming that the functions $f_1$ and $f_2$ represent the recording of a wave field at time t at a fixed receiver coordinate, source coordinate x, and fixed depth, where the recorded wave field at this depth is a solution to the homogeneous wave equation with a velocity c. The wave fields are generated at discrete values of x which we assume to be equally spaced, i.e. of the form $x=\Delta_x k$.

We now assume that the two sources are used simultaneously, in such a way that their mixture takes the form $$d(t, k) = f_1(t, k\Delta_x) + f_2(t - \Delta_t(-1)^k, k\Delta_x)$$
$$= \mathcal{F}^*(\hat{f}_1)(t, k\Delta_x) + \mathcal{F}^*(\hat{f}_2(\omega, \xi) e^{-2\pi i (-1)^k \Delta_t \omega})$$
$$(t, k\Delta_x),$$

i.e., the recorded data is now modelled as a sum of the two functions, but where one of them has been subjected to a periodic time shift. In a more general version more general filtering operations than time shifts can be applied. Let $a_k$ be filter operators (acting on the time variable) where the k dependence is such it only depends on if k is odd or even, i.e., that $a_k = a_{k(mod2)}$.

$$d(t, k) = f_1(t, k\Delta_x) + a_k f_2(t - \Delta_t(-1)^k, k\Delta_x) \tag{2}$$
$$= \mathcal{F}^*(\hat{f}_1)(t, k\Delta_x) + \int a_k(\omega) \int \hat{f}_2(\omega, \xi) e^{2\pi i k \Delta_x \xi}$$
$$d\xi e^{2\pi i (t-(-1)^k \Delta_t) \omega} d\omega$$
$$= \mathcal{F}^*(\hat{f}_1)(t, k\Delta_x) + (\mathcal{J}\mathcal{F}^*(\hat{f}_2))(t, k\Delta_x),$$

It can be shown that $$D_1(\omega, \xi) = \int_{-\infty}^{\infty} \sum_{k=-\infty}^{\infty} d(t, k) e^{-2\pi i (k\Delta_x \xi + t\omega)} dt = \left( \sum_{k=-\infty}^{\infty} \hat{f}_1\left(\omega, \xi + \frac{k}{\Delta_x}\right) \right) + \tag{3}$$
$$\left( \sum_{k=-\infty}^{\infty} \hat{f}_2\left(\omega, \xi + \frac{k}{2\Delta_x}\right) \right) \frac{1}{2} (\hat{a}_0(\omega) e^{-2\pi i \Delta_t \omega} + (-1)^k \hat{a}_1(\omega) e^{-2\pi i \Delta_t \omega}).$$

Now, due to the assumption of conic support of $\hat{f}_1$ and $\hat{f}_2$ it holds that if $$|\xi| < \frac{|\omega|}{c}, |\omega| < c\left|\xi - \frac{1}{\Delta_x}\right|, |\omega| < c\left|\xi + \frac{1}{\Delta_x}\right|, \tag{4}$$

then only the terms where k=0 above contribute, and the following simplified relation holds $$D_1(\omega, \xi) = \hat{f}_1(\omega, \xi) + \hat{f}_2(\omega, \xi) \frac{\hat{a}_0(\omega) e^{-2\pi i \Delta_t \omega} + \hat{a}_1(\omega) e^{-2\pi i \Delta_t \omega}}{2}.$$

In a similar fashion it holds for $$D_2(\omega, \xi) = \int_{-\infty}^{\infty} \sum_k d(t + \Delta_t(-1)^k, k) e^{-2\pi i (k\xi + t\omega)} dt, \tag{5}$$
$$= \hat{f}_1 \cos(2\pi \Delta_t \omega)(\omega, \xi) + \hat{f}_2(\omega, \xi)$$
$$\frac{\hat{a}_0(\omega) + \hat{a}_1(\omega)}{2}.$$

This implies that for each pair $(\omega,\xi)$ satisfying (4), the values of $\hat{f}_1(\omega,\xi)$ and $\hat{f}_2(\omega,\xi)$ can be obtained by solving the linear system of equations $$\begin{pmatrix} 1 & \frac{\hat{a}_0(\omega) e^{-2\pi i \Delta_t \omega} + \hat{a}_1(\omega) e^{2\pi i \Delta_t \omega}}{2} \\ \cos(2\pi \Delta_t \omega) & \frac{\hat{a}_0(\omega) + \hat{a}_1(\omega)}{2} \end{pmatrix} \begin{pmatrix} \hat{f}_1(\omega, \xi) \\ \hat{f}_2(\omega, \xi) \end{pmatrix} = \tag{6}$$
$$\begin{pmatrix} D_1(\omega, \xi) \\ D_2(\omega, \xi) \end{pmatrix}.$$

Figure 5:
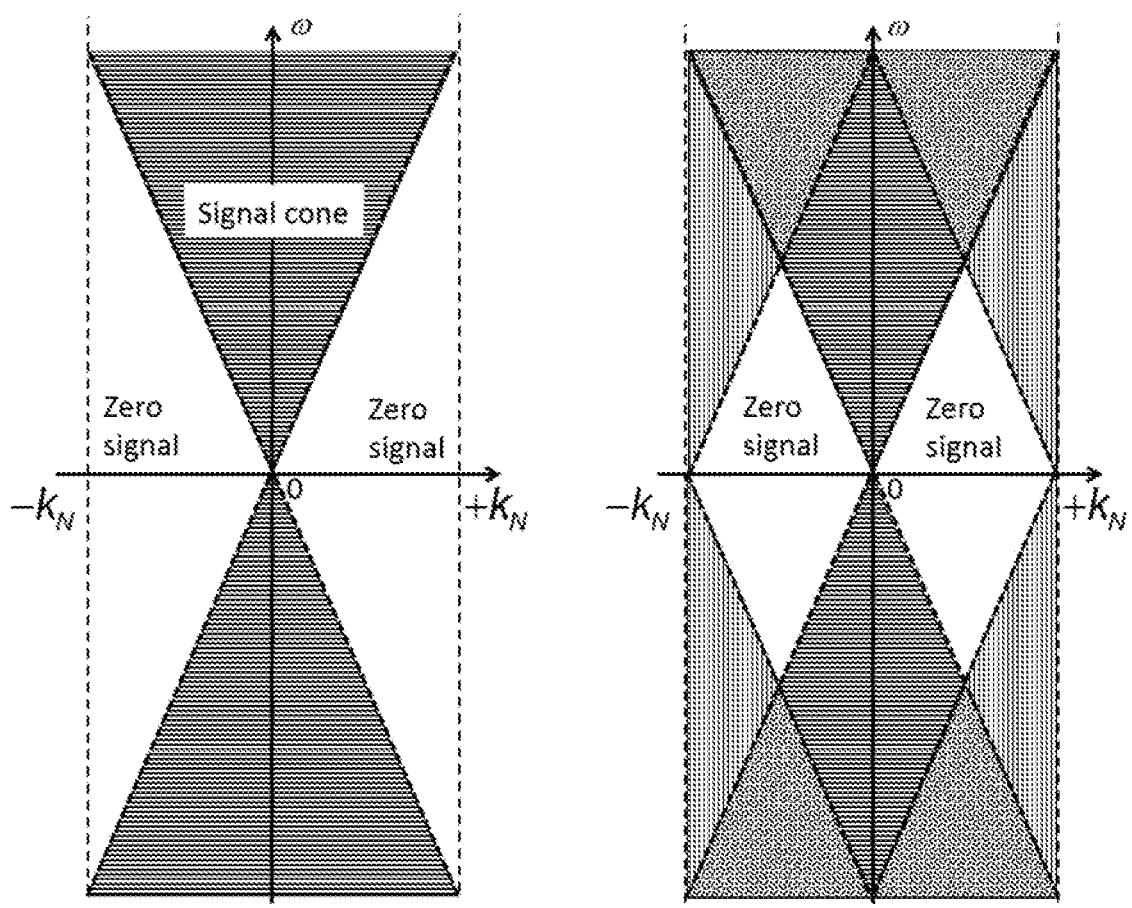
FIG. 5 is the function $D_1(\omega,\xi)$ from (3) for a set of apparition blended synthetic data with noise. The left panel shows, defined by the cone, the region described by (1), while the central part in the right panel shows the diamond shaped conditions (4), and the aliasing/mixing effects from (3) and (5)

This provides information on how to recover the wave fields $f_1$ and $f_2$ for frequencies either up to the limit $c/(4\Delta_x)$, or more generally, satisfying the (diamond shaped) condition (4). The overlaps of the cones are illustrated in FIG. 5, where the left panel shows the cone given by (1), and the right panel the diamond shaped region described by (4). In this approach the deblending takes place by considering the data available in the central cone of FIG. 5.

An alternative approach for reconstruction, is by noting that if either of the support constraints (1) or (4) are satisfied, then it holds that for the values of $(\omega,\xi)$ of interest that (3) reduces for instance to $$D_1\left(\omega, \xi - \frac{1}{2\Delta_x}\right) = \hat{f}_2(\omega, \xi) \frac{1}{2} (\hat{a}_0(\omega) e^{-2\pi i \Delta_t \omega} + (-1)^k \hat{a}_1(\omega) e^{-2\pi i \Delta_t \omega}),$$

implying that $\hat{f}_2(\omega,\xi)$ can be recovered from $$D_1\left(\omega, \xi - \frac{1}{2\Delta_x}\right).$$

In a similar fashion, $\hat{f}_1(\omega,\xi)$ can be recovered from $$D_2\left(\omega, \xi - \frac{1}{2\Delta_x}\right).$$

In this way, the deblending can be achieved by direct consideration of the data in the shifted cones illustrated in FIG. 5.

From (6) it is possible to recover the functions $f_1$ and $f_2$ partially. Let w be a filter such that $\hat{w}$ has support inside the region described by (4). It is then possible to recover $$h_1 = w * f_1, h_2 = w * f_2. \quad (7)$$

For values of $(\omega,\xi)$ outside the region described by (4), it is not possible to determine $\hat{f}_1(\omega,\xi)$ and $\hat{f}_2(\omega,\xi)$ uniquely without imposing additional constraints. Typically, seismic data can locally be well described by sums of plane wave with different direction. The plane waves carry the imprint of the source wavelet, and according to ray theory the data from such a plane event should have the same directionality for the frequency range that covers the source wavelet. We will use this information to construct a directionality penalty that we can use for the separation of the two wave fields $f_1$ and $f_2$ from the blended data d. This directionality penalty is equivalent to, by means of local coordinate transformations, imposing a bandwidth limitation in undesired directions for the purpose of suppressing aliasing.

One way of estimating local directionality is by means of so-called structure tensors. For the two known wave fields $h_1$ and $h_2$ the corresponding structure tensors are defined as $$T_1(t,x) = \begin{pmatrix} \left(K * \left(\frac{\partial h_1}{\partial t}\right)^2\right)(t,x) & \left(K * \frac{\partial h_1 \partial h_1}{\partial t \partial x}\right)(t,x) \\ \left(K * \frac{\partial h_1 \partial h_1}{\partial t \partial x}\right)(t,x) & \left(K * \left(\frac{\partial h_1}{\partial x}\right)^2\right)(t,x). \end{pmatrix}$$

and similarly for $T_2$ and $h_2$. Above, the function K describes a smooth, localizing windows, for instance a Gaussian. The eigenvalues of $T_1$ and $T_2$ will point-wise describe the local energy in the direction of maximum and minimum variation, and the associated eigenvectors contain the corresponding directions. The tensors are computed as elementwise convolutions of the outer product of the gradient of the underlying function, and this directly defines the generalization to higher dimensions. For the sake of simplicity, we describe here the two-dimensional case.

Let $s_1^1(t,x)$ and $s_2^1(t,x)$ be the eigenvalues of $T_1(t,x)$, and let $e_1^1(t,x)$ and $e_2^1(t,x)$ denote the corresponding eigenvectors. If the wave field $f_1$ only has energy in one direction in the vicinity around (t,x) covered by K, then this implies that $$s_2^1(t,x)=0,$$

which in turn means that $$\nabla f_1 \cdot e_2^1 = 0. \quad (8)$$

The eigenvectors $e_1^1(t,x)$ and $e_2^1(t,x)$ define local coordinate transformation that describe directions of large and small variations. Along the directions specified by $e_2^1(t,x)$ only low-frequency components are to be dominant, and by suppressing the bandwidth of the reconstructions in these directions is an efficient way of de-aliasing the separated sources.

This property (8) is clearly not always satisfied (although counterparts in higher dimension hold more frequently with increased dimensionality), however it is a property that can be used as a penalty from which the blended data can be deblended. Even if (8) is not satisfied, the relation can be used to minimize the energy of the deblended data in the directions carried from $h_1$ and $h_2$, respectively.

From (8) we have a condition on the gradient of $f_1$ and $f_2$ when one the eigenvectors vanish. For the more general case, we would need to formulate a penalty function that can deal with the cases where the components change gradually, and at places where the eigenvectors are equal in size, and equal amount of penalty should be used for the two directions. One such choice is to define $$S(T_m) = \sum_{j=1}^{2} s_j(\sigma) e_j^m (e_j^m)^T, \quad T_m = \sum_{j=1}^{2} \sigma_j e_j^m (e_j^m)^T$$

with $$s_1(\sigma) = \frac{1}{2} \cdot \frac{\sigma_2^2}{\sigma_1^2} \exp\left(-\frac{1}{2} \cdot \frac{\sigma_2}{\sigma_1}\right)$$

$$s_2(\sigma) = \left(1 - \frac{1}{2} \cdot \frac{\sigma_2}{\sigma_1}\right) \exp\left(-\frac{1}{2} \cdot \frac{\sigma_2}{\sigma_1}\right).$$

These functions have the property that $$\lim_{\sigma_2 \to 0} (s_1, s_2) \to (0, 1) \text{ and}$$

$$s_1(\sigma_1, \sigma_1) = s_2(\sigma_1, \sigma_1).$$

implying that (8) will be satisfied in the case where there is locally only energy in one direction, and where an equal amount of penalty will be applied in the case where there is the same amount of energy in both directions. Note that the local coordinate transformations are now implicitly given in the operator S.

This definition now allows for the generalization of (8) to penalty functionals $$\iint ((\nabla f_1)^T S(T_1) \nabla f_1)(t,x) dt dx,$$

and $$\iint ((\nabla f_2)^T S(T_2) \nabla f_2)(t,x) dt dx$$

for the two wave fields. The expressions above describe the energy in the undesirable direction, given the knowledge of the band-passed versions $h_1$ and $h_2$, respectively. The de-aliasing is now taken place by punishing high frequencies (by the derivatives) along the directions given by the local coordinate transformations specified by $e_1^1(tx)$ and $e_2^1(t,x)$.

Before we use these expressions to define a minimization problem that describes the deblending procedure, we incorporate the original cone condition (1) in the formulation. To this end, we will now work with sampled representations of $\hat{f}_1$ and $\hat{f}_2$. By abuse of notation, we will use $\hat{f}_1$ and $\hat{f}_2$ to denote these sampled values.

We let $\mathcal{F}F_c^*$ denote the inverse Fourier operator that is restricted to functions supported on the cone defined by (1). Recall the definition of the apparition operator $\mathcal{T}$ from (2). The relationship (2) is then satisfied for (the non-unique) solutions to $$\min_{\hat{f}_1, \hat{f}_2} \|\mathcal{F}_c^* \hat{f}_1 + \mathcal{T}\mathcal{F}_c^* \hat{f}_2 - d\|^2,$$

with the additional constraint that $\hat{f}_1$ and $\hat{f}_2$ have support on the cone defined by (1). To obtain a unique approximate solution, we now add the directionality penalties and consider $$\min_{\hat{f}_1,\hat{f}_2}\|\mathcal{F}_c^*\hat{f}_1+\mathcal{T}\mathcal{F}_c^*\hat{f}_2-d\|^2+ \qquad (9)$$

$$\int\int((\nabla(\mathcal{F}_c^*\hat{f}_1))^T S(T_1)\nabla(\mathcal{F}_c^*\hat{f}_1))(t,x)dtdx+$$

$$\int\int((\nabla(\mathcal{F}_c^*\hat{f}_2))^T S(T_2)\nabla(\mathcal{F}_c^*\hat{f}_2))(t,x)dtdx.$$

with the same cone constraint. To find the minima of (9), we compute the Fréchet derivatives of the objective function (9) with respect to the functions $\hat{f}_1$ and $\hat{f}_2$ and equate them to zero as they should at a minimum. The first term in (9) is straightforward to derive, and concerning the other two terms it is readily verified using partial integrations that their Fréchet derivatives are described by the elliptic operators $$D_m(f)=-\nabla(S(T_m)\nabla f).$$

To formulate the solution to (9), let $$b_1=\mathcal{F}_c d, b_2=\mathcal{F}_c \mathcal{T} d,$$

Furthermore, introduce $$A_F = \begin{pmatrix} \mathcal{F}_c\mathcal{F}_c^* & \mathcal{F}_c\mathcal{T}\mathcal{F}_c^* \\ \mathcal{F}_c\mathcal{T}^*\mathcal{F}_c^* & \mathcal{F}_c\mathcal{F}_c^* \end{pmatrix}, \text{ and}$$

$$A_D = \alpha\begin{pmatrix} \mathcal{F}_c D_1 \mathcal{F}_c^* \\ \mathcal{F}_c D_2 \mathcal{F}_c^* \end{pmatrix}.$$

Equating the Fréchet derivatives of (9) with respect to $\hat{f}_1$ and $\hat{f}_2$ to zero then yield the linear relationship $$(A_F\ A_D)\begin{pmatrix}\hat{f}_1\\\hat{f}_2\end{pmatrix}=\begin{pmatrix}b_1\\b_2\end{pmatrix} \qquad (10)$$

for the solution of (9). This equation can be solved using an iterative solver for linear equations, for instance the conjugate gradient method. The operators in $A_F$ are realized using standard FFT, and the operators in $A_D$ are computed using a combinations of Fourier transforms and differential schemes, that also can be implemented by using FFT. The operator $A_F$ describe the fit to data, while the operator $A_D$ describe the de-aliasing that takes places using the local coordinate transformations induced from $e_1^1(tx)$ and $e_2^1(t,x)$. Finally, the regularization parameter $\alpha$ controls the amount of penalty that is put on oscillations in undesired directions.

Example

Figure 6:
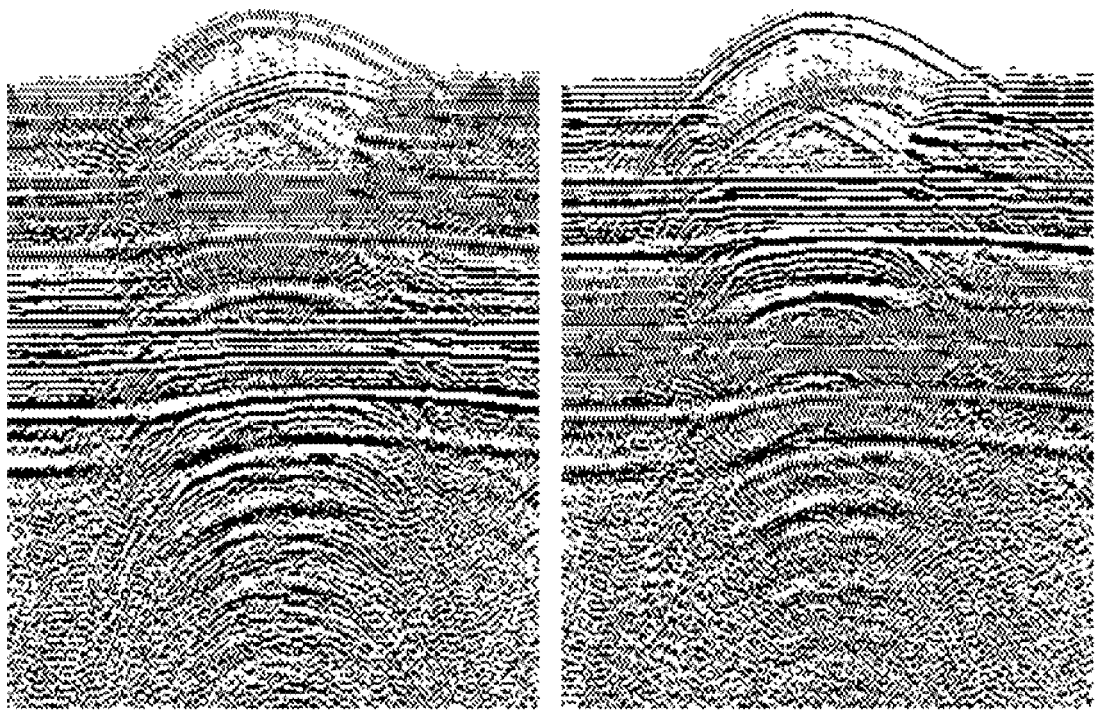
FIG. 6 is blended synthetic data used to illustrate a second method that improves the separation of aliased simultaneous source data. Left panel d and right panel $\mathcal{T}$ *d.
Figure 7:
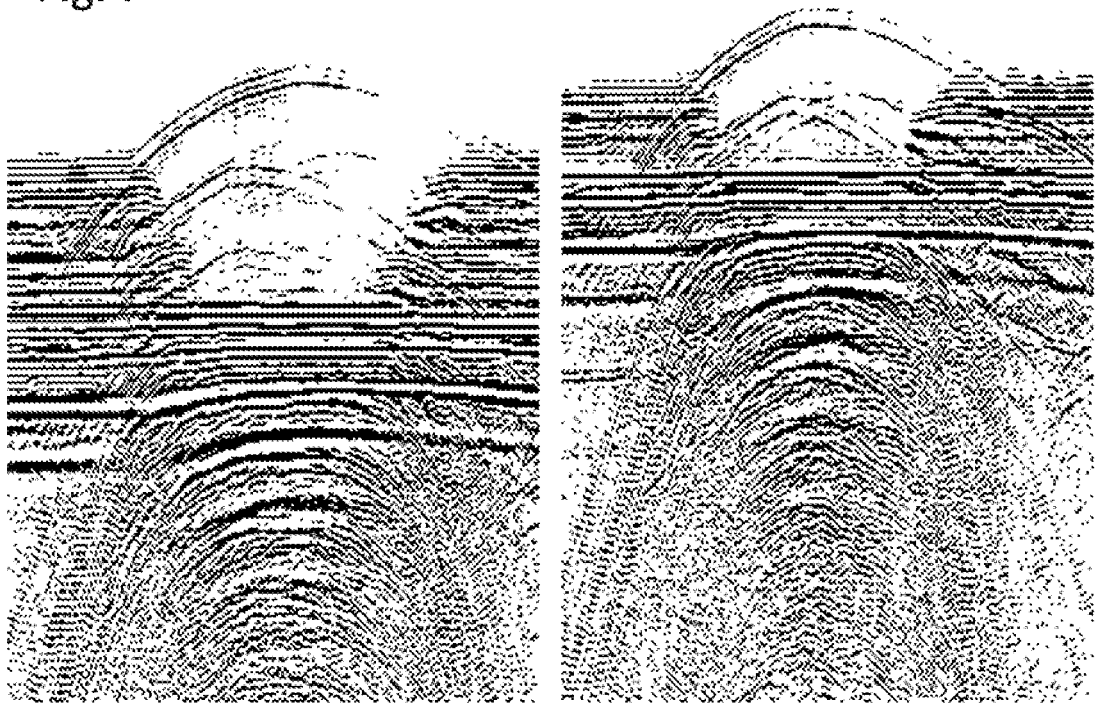
FIG. 7 is the original synthetic data used to illustrate the efficacy of the second method with left panel $f_1$ and right panel $f_2$.
Figure 8:
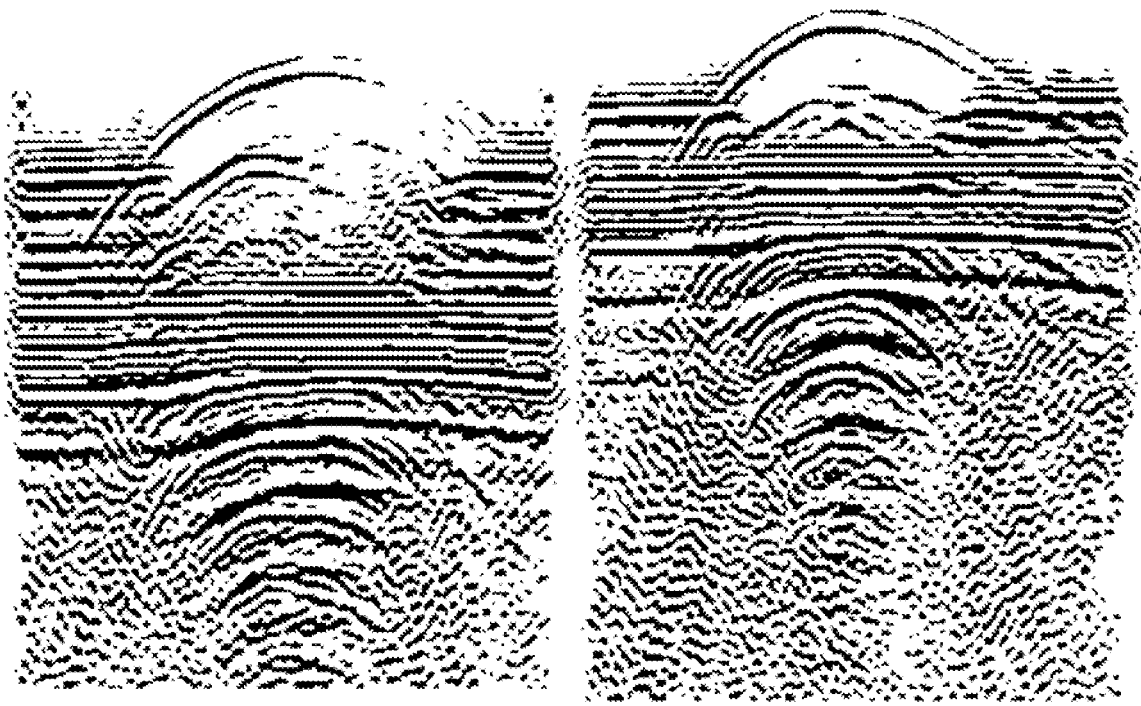
FIG. 8 is recovered filtered versions used in the second method.
Figure 9:
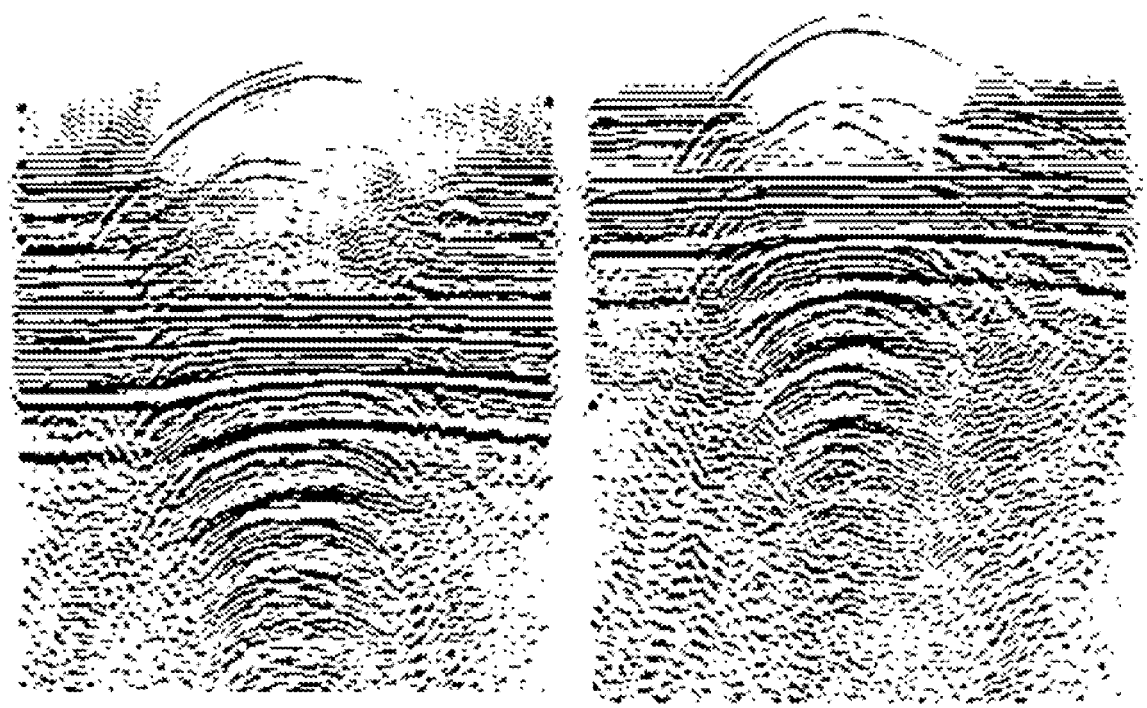
FIG. 9 is deblended data obtained using the second method. The reconstruction of $f_1$ is shown in the left panel and the reconstruction of $f_2$ in the right panel.

Synthetic seismic data were generated using a finite-difference code. The blended data from (2) are depicted in FIG. 6, where the left panel shows d (where $f_1$ is non-apparated) and $\mathcal{T}^*d$ (where $f_2$ is non-apparated). The original data are shown in FIG. 7, with $f_1$ in the left panel and $f_2$ in the right panel. These data are shown with a twice as dense spatial sampling as the one used for FIG. 6, and the following figures will also illustrate results at this higher sampling rate. Given the blended data, the filter versions $h_1$ and $h_2$ are computed using (6) and (7). The filter w used in this case has more narrow bandwidth than necessary for the sake of illustration. The recovered filtered versions are illustrated in FIG. 8. Using $h_1$ and $h_2$ structure tensors are computed as well as the penalty tensors $S(T_1)$ and $S(T_2)$. The minimization problem (9) is then solved by applying the conjugate gradient to (10), and the results are shown in FIG. 9, with the reconstruction of $f_1$ in the left panel and the reconstruction of $f_2$ in the right panel.

De-Aliasing Using Coordinate Transformations

Mutual Parabolic Change of Coordinates

As seen, for the direct deblending using seismic apparition to work it is required that the energy is contained in either a combination of the cone constraint (1) along with the condition $|\omega|<c/(4\Delta_x)$, or in the larger domain determined by (4). Given the characteristics of seismic data, improvements to these constraints can sometime be obtained by changes of coordinates. The simplest case where this can be utilized is by using a parabolic change of coordinates. This would apply in cases where the two source locations are close to each other. Let $E^k$ describe the coordinate map $$t=E^k(\tau)=\tau+qx^2,$$

for some choice of parameter q. Now, let $$d^{par}(\tau,k)=d(E^k(\tau),k)=\mathcal{F}^*(\hat{f}_1)(\tau+qx^2,k\Delta_x)+(\mathcal{T}\mathcal{F}^*(\hat{f}_2))(\tau+qx^2,k\Delta_x),$$

and let $$f_1^{par}(\tau,x)=f_1(\tau+qx^2,x) \text{ and } f_2^{par}(\tau,x)=f_2(\tau+qx^2,x).$$

Clearly, it holds that $$(\mathcal{T}\mathcal{F}*(\hat{f}_2))(\tau+qx^2,k\Delta_x)=a_k f_2(t+qx^2-\Delta_t(-1)^k,k\Delta_x)$$
$$=a_k f_2^{par}(t-\Delta_t(-1)^k,k\Delta_x)=(\mathcal{T}\mathcal{F}*(\hat{f}_2^{par}))(\tau,k\Delta_x).$$

It then holds that $$d^{par}(\tau,k)=\mathcal{F}*(\hat{f}_1^{par})(\tau,k\Delta_x)+(\mathcal{T}\mathcal{F}*(\hat{f}_2^{par}))(\tau,k\Delta_x),$$

and the regular apparition technique can now be directly applied to $d^{par}(\tau,k)$ to deblend $f_1^{par}$ and $f_2^{par}$ and hence also $f_1$ and $f_2$.

Example

Figure 10:
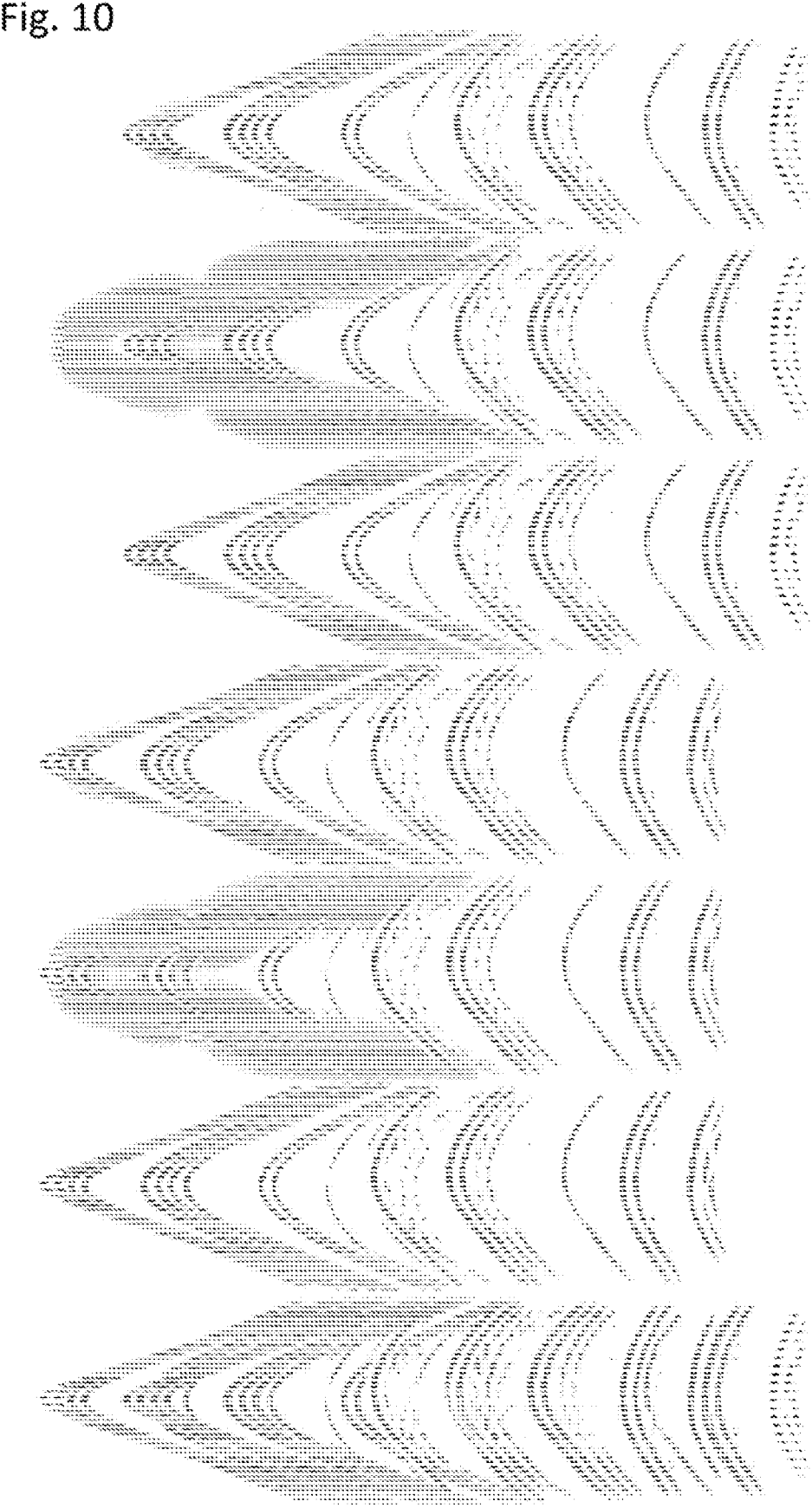
FIG. 10 illustrates the de-aliasing effect of applying a parabolic change of coordinates in which the data consist of a blend of two sources with the same spatial offset, but with a certain time delay between them. The blended data are shown in the left panel. The following three panels show from left to right: the original wave field from source 1; the deblended result for source 1 without using the parabolic coordinate transformation; the deblended result for source 1 using the parabolic coordinate transformation. The final three panels show the same results for source 2.

FIG. 10 illustrates the de-aliasing effect of applying a parabolic change of coordinates. The data consists of a blend of two sources with the same spatial offset, but with a certain time delay between them. The blended data are shown in the left panel of FIG. 10. The following three panels show from left to right: the original wave field from source 1; the deblended result for source 1 without using the parabolic coordinate transformation; the deblended result for source 1 using the parabolic coordinate transformation. The final three panels show the same results but now for source 2.

Separate Coordinate Systems and NMO

Next, we consider the situation where aliasing effects can be reduced for $f_1$ and $f_2$ when exposed to two different sets of coordinate transformation. Let $$E_1^k:\mathbb{R}\to\mathbb{R}, \text{ and } E_2^k:\mathbb{R}\to\mathbb{R}$$

be continuous bijective coordinate transformations, and let $$f_1''(\tau k\Delta_x)=f_1(E_1^k(\tau),k\Delta_x), \text{ and } f_2''(\tau,k\Delta_x)=f_2(E_2^k(\tau),k\Delta_x).$$

The purpose of the coordinate transformations is to make the effective support of $\hat{f}_1''$ and $\hat{f}_2''$ be smaller than $\hat{f}_1$ and $\hat{f}_2$, or at least that the energy content that is contained in regions of the form (4) relative to the total energy is higher for the functions $\hat{f}_1''$ and $\hat{f}_2''$ in comparison to that of $\hat{f}_1$ and $\hat{f}_2$. In this way the aliasing effects when making reconstructions with limited frequency support hopefully be reduced.

However, the reduction of the aliasing effect for, say the first source, can have a negative influence on the aliasing of the second source when applying the coordinate transformations to blended data. In many cases, the data can not be separated directly, but the effects on both the sources need to be taken into account. The interplay between the two sources and the coordinate transformations can be modelled by means of linear systems, and by solving these systems we can obtain de-aliased deblending.

Recall that in the regular apparition setup, the functions $f_1$ and $f_2$ could be recovered using either the central frequency cone or one of the aliased versions. In the case where the central cone was used, a (2×2) system of equations has to be solved for the recovery of the point-wise values of $\hat{f}_1(\omega,\xi)$ and $\hat{f}_2(\omega,\xi)$, while when considering the the shifted cones, the values of $\hat{f}_1(\omega,\xi)$ and $\hat{f}_2(\omega,\xi)$ were obtained directly by a correction factor. In the presence of the coordinate transformations, neither one of the solutions will be directly applicable. However, it will still be the case that most of the energy (excluding induced aliasing effects from the opposite coordinate map) in the shifted cones will be due to only one of the two sources. We will make use of this fact, in combination with the fact that the sum of the two representations should equal the measured data, and in this way set up a linear system of equations for the solution of the de-aliased-deblending problem.

To simplify the presentation, let us assume in this section that the filter operators $a_k$ are identity operators. Let us introduce $$d_1^n(\tau,k)=f_1(E_1^k(\tau)+\Delta_t(-1)^k,k\Delta_x)+f_2(E_1^k(\tau),k\Delta_x)$$

and $$d_2^n(\tau,k)=f_1(E_2^k(\tau),k\Delta_x)+f_2(E_2^k(\tau)-\Delta_t(-1)^k,k\Delta_x).$$

By assuming sufficiently dense sampling in time, $d_1^n$ and $d_2^n$ can be computed by resampling of the measured data d. We now seek representations of $d_1^n$ and $d_2^n$ using the (non-aliased) Fourier representations $\hat{f}_1^n$ and $\hat{f}_2^n$. These representations read $$d_1^n(\tau,k) = (\mathcal{F}^*\hat{f}_1^n)((E_1^k)^{-1}(E_1^k(\tau)+\Delta_t(-1)^k),k\Delta_x)+(\mathcal{F}^*\hat{f}_2^n)((E_2^k)^{-1}(E_1^k(\tau)),k\Delta_x).$$

and $$d_2^n(\tau,k) = (\mathcal{F}^*\hat{f}_1^n)((E_1^k)^{-1}(E_2^k(\tau)),k\Delta_x)+(\mathcal{F}^*\hat{f}_2^n)((E_2^k)^{-1}(E_2^k(\tau)-\Delta_t(-1)^k),k\Delta_x).$$

respectively. Suppose now that $\tau$ is sampled discretely at equally spaced points, specifically $$\tau^0(j) = j\Delta_\tau, -\frac{N_\tau}{2} \le j < \frac{N_\tau}{2},$$

with a sampling in the corresponding frequency variable $$\Omega(j') = j'\Delta_\Omega, -\frac{N_\tau}{2} \le j < \frac{N_\tau}{2},$$

where $(\Delta_\tau\Delta_\Omega)^{-1}=N_\tau$. Also, let $\Xi(k')$ be an equally spaced sampling of the spatial frequency parameter $\xi$.

Let us introduce the coordinates $$\tau_{j,k}^{11}=(E_1^k)^{-1}(E_1^k(\tau)+\Delta_t(-1)^k),k\Delta_x),$$

$$\tau_{j,k}^{12}=(E_2^k)^{-1}(E_1^k(\tau)),k\Delta_x),$$

$$\tau_{j,k}^{21}=(E_1^k)^{-1}(E_2^k(\tau)),k\Delta_x),$$

$$\tau_{j,k}^{22}=(E_2^k)^{-1}(E_2^k(\tau)-\Delta_t(-1)^k),k\Delta_x).$$

We seek discrete Fourier representations of $d_1^n(\tau,k)$ and $d_2^k(\tau,k)$, respectively. For these representations, we want to include only the frequencies that satisfy the condition (4) or something similar. To this end, we introduce the mapping $\iota$: $\mathbb{Z} \to \mathbb{Z}^2$ that is indexing the points $(\Omega(j'),\Xi(k'))$, i.e., such that all the points $(\Omega(\iota(l)),\Xi(\iota(l)))$ satisfy a condition similar to (4).

The Fourier representations can then be expressed using the element-wise defined Fourier matrices $$\mathcal{F}*^{11}(l;(j,k))=e^{2\pi i(\Xi(\iota(l))k\Delta_x+\Omega(\iota(l))\tau_{j,k}^{11})},$$

$$\mathcal{F}*^{12}(l;(j,k))=e^{2\pi i(\Xi(\iota(l))k\Delta_x+\Omega(\iota(l))\tau_{j,k}^{12})},$$

$$\mathcal{F}*^{21}(l;(j,k))=e^{2\pi i(\Xi(\iota(l))k\Delta_x+\Omega(\iota(l))\tau_{j,k}^{21})},$$

$$\mathcal{F}*^{22}(l;(j,k))=e^{2\pi i(\Xi(\iota(l))k\Delta_x+\Omega(\iota(l))\tau_{j,k}^{22})},$$

By abuse of notation, we now use $\hat{f}_1^n$ and $\hat{f}_2^n$ also for the discrete representations, and similarly for $d_1^n$ and $d_2^n$. We then have that $$d_1^n = \mathcal{F}*^{11}\hat{f}_1^n + \mathcal{F}*^{12}\hat{f}_2^n,$$

and $$d_2^n = \mathcal{F}*^{21}\hat{f}_1^n + \mathcal{F}*^{22}\hat{f}_2^n,$$

The next step is now to provide a formulation where the contribution from the two sources can be separated. As a first step, we will make use of the fact that the energy present in the shifted Fourier cones of $d_1^n$ and $d_1^n$ corresponds primarily of energy from $f_1^n$ and $f_2^n$, respectively. Defining $\mathcal{F}^0$ element-wise by $$\mathcal{F}^0(l;(j,k))=e^{-2\pi i(\Xi(\iota(l))k\Delta_x+\Omega(\iota(l))\tau^0(j))}.$$

Recall that a frequency shift in representations using the discrete Fourier transform can be represented by a multiplication by $(-1)^k$. Hence, define $$Sf(\tau,k)=(-1)^k f(\tau,k).$$

as the operator that is shifting information to the cones of interest. This implies that the $\hat{f}_2^n$ is almost in the null-space of the mapping $$(\hat{f}_1^n,\hat{f}_2^n) \mapsto \mathcal{F}^0 S(\mathcal{F}*^{11}\hat{f}_1^n + \mathcal{F}*^{12}\hat{f}_2^n)$$

and similarly, $\hat{f}_1^n$ is almost in the null-space of the mapping $$(\hat{f}_1^n,\hat{f}_2^n) \mapsto \mathcal{F}^0 S(\mathcal{F}*^{21}\hat{f}_1^n + \mathcal{F}*^{22}\hat{f}_2^n),$$

or in other words, the mapping $$(\hat{f}_1^n,\hat{f}_2^n) \mapsto (\mathcal{F}^0 S(\mathcal{F}*^{11}\hat{f}_1^n + \mathcal{F}*^{12}\hat{f}_2^n), \mathcal{F}^0 S(\mathcal{F}*^{21}\hat{f}_1^n + \mathcal{F}*^{22}\hat{f}_2^n))$$

is almost block-diagonal. The matrix describing the map above will be square, and hence an iterative method such as the generalized minimal residual method (GMRES) could be applied to this problem, given the right hand side $$\begin{pmatrix} \mathcal{F}^0 S d_1^n \\ \mathcal{F}^0 S d_2^n \end{pmatrix}.$$

However, using this information by itself means some loss of control in the residual to the data fit. To counteract that effect, we can also include an error term for the fit to the measured data. An overdetermined system for this case then reads $$\begin{pmatrix} \mathcal{F}^0 S \mathcal{F}^{*11} & \mathcal{F}^0 S \mathcal{F}^{*12} \\ \mathcal{F}^0 S \mathcal{F}^{*21} & \mathcal{F}^0 S \mathcal{F}^{*22} \\ a\mathcal{F}^{*11} & \mathcal{F}^{*12} \\ a\mathcal{F}^{*21} & \mathcal{F}^{*22} \end{pmatrix} \begin{pmatrix} \hat{f}_1^n \\ \hat{f}_2^n \end{pmatrix} = \begin{pmatrix} \mathcal{F}^0 S d_1^n \\ \mathcal{F}^0 S d_2^n \\ a d_1^n \\ a d_2^n \end{pmatrix}. \quad (11)$$

Let us end by discussing how to choose the coordinate transformation when dealing with NMO for different parameterizations. Let us define the Heaviside function by $$\Theta(t) = \begin{cases} 1 & \text{if } t \geq 0 \\ 0 & \text{otherwise} \end{cases}$$

and define $\text{sign}(t) = 2\Theta(t) - 1$. Let us define the NMO mapping $E_{\tau_0, t_0, q}^x$ by $$t = E_{\tau_0, t_0, q}^x(\tau) = t_0 + \text{sign}(\tau - \tau_0) \sqrt{(\tau - \tau_0)^2 + q(x - x_0)^2} + 2\Theta(\tau - \tau_0)\sqrt{q}|x - x_0|. \quad (12)$$

This mapping is bijective with inverse $$\tau = (E_{\tau_0, t_0, q}^x)^{-1}(t) = \tau_0 + \text{sign}(t - t_0 + \sqrt{q}|x - x_0|) \times \sqrt{(t - t_0 + 2(\Theta(t - t_0 - \sqrt{q}|x - x_0|) - 1)\sqrt{q}|x - x_0|)^2 - q(x - x_0)^2}.$$

This coordinate transformation is chosen such that $$\frac{d}{dt}(E_{\tau_0, t_0, q}^x)^{-1}(t)$$

is continuous.

Note that the proposed methods of using coordinate transformations could favourably be applied simultaneously, where expected known aliasing effects can be reduced using for instance the NMO mappings mentioned above, along with a data driven de-aliasing part that uses the local coordinate transformations for the directionality penalties.

Figure 11:
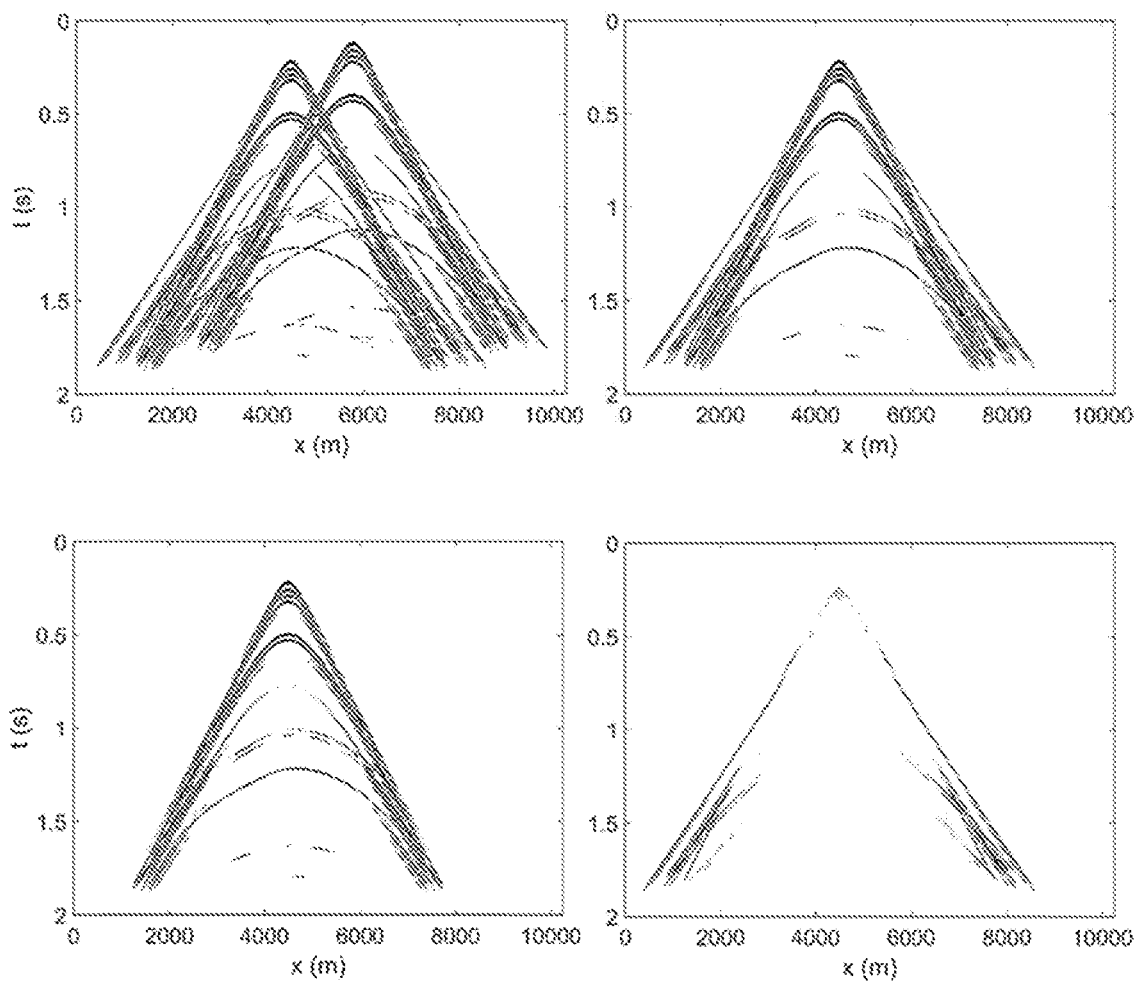
FIG. 11 illustrates the improved simultaneous source separation that can be achieved in the presence of aliasing by using two sets of hyperbolic coordinate transformations. Shown are: in the top left, the blended input data; in the top right, the original source 1 input data; in the bottom left, the deblended result; and in the bottom right, the difference between the original and the deblended result.

In this example we illustrate the proposed de-aliasing approach for the deblending problem by using two sets of hyperbolic coordinate transformations (NMO) of the form (12). The results are depicted in FIG. 11. The panels of the four figures are organized as follows: The top left panel shows the blended data; the top right panel shows the original function; the bottom left panel shows the deblended result by solving (11); and the bottom right panel shows the difference between the original and the deblended result.

In yet another embodiment, if we apply an NMO correction to acquired simultaneous source data acquired using seismic apparition principles, one of the sources, say source A, will only produce a signal cone at k=0 (i.e., at zero horizontal wavenumber) but that now is more compactly supported as a result of the NMO correction. However, the other source, say source B, will produce two more compactly supported signal cones centered at k=0 and k=$k_n$. We can therefore isolate the signal cone at k=$k_n$ (i.e., at Nyquist horizontal wavenumber) and apply inverse NMO correction to achieve approximate separation of the wave field due to source A. Such approximate separation methods could yield acceptable results, particularly when combined with other methods such as least-squares adaptive subtraction (Dragoset, 1995).

Alternatively, we could use an apparition function which does not involve a time shift (e.g., A=0.5). In this case, the apparition encoding function will be "immune" to the stretch effect of NMO correction such that the described non time-variant separation methods can be used. Yet another option to continue using the described non time-variant separation methods would be to use stretch-free NMO operators which have been proposed previously (e.g., Trickett, 2003; Zhang et al., 2012).

Another method when using, e.g., time-shifts as apparition encoding functions is to use NMO and create a look-up table of many solutions for different time shifts. We then piece together solutions sample by sample by choosing the appropriate sample in time and space for the time shift for a specific sample taking into account both the original time shift and the distortion introduced by NMO correction.

We note that (source) ghost reflections can also be considered simultaneous sources and, e.g., the improved separation in the presence of aliasing methods described above also apply to the problem of (source) deghosting by simultaneous source deblending in the presence of aliasing.

Figure 12:
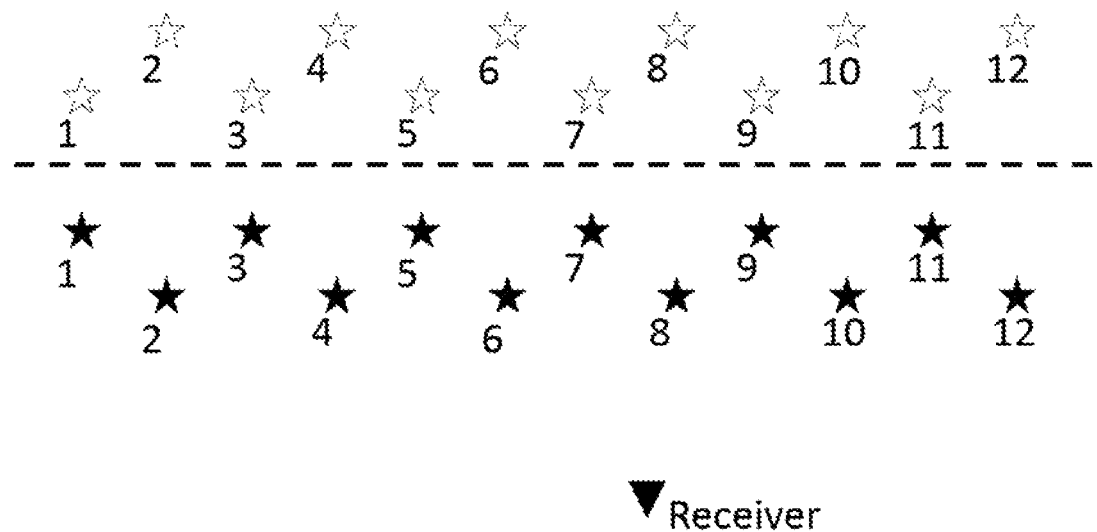
FIG. 12 shows how a line of ghost sources acquired with alternating depths can be thought of as being constructed from ghost sources at a uniform distance from the original sea surface location by convolution with a modulation function.
Figure 13:
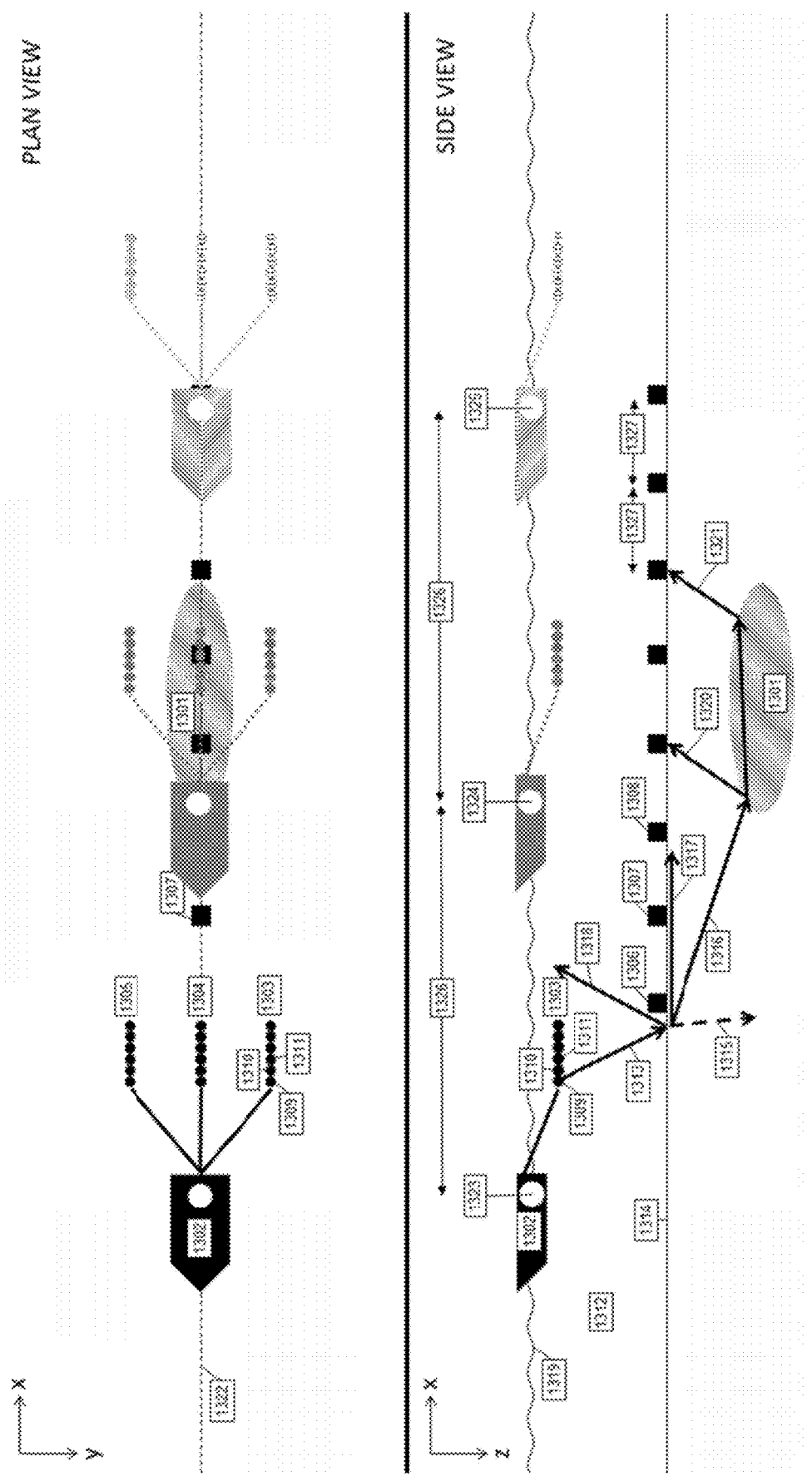
FIG. 13 illustrates the general practice of marine seismic surveying.

To understand source deghosting by simultaneous source deblending, consider the following example: a line of ghost sources with alternating depths such as shown in FIG. 12 (open white stars) can be thought of as being constructed from ghost sources at a uniform distance from the original sea surface location ($-z_1$, i.e., the level closest to the original sea surface location) through the convolution of a modulation function:

$$\hat{p}^g(n_x, n_y) = m_1(n_x, n_y) * p^g(n_x, m_y), \quad (13)$$

where the lower case variables denote expressions in the time space domain, $n_x$ is the shot number (spaced uniformly along a line) in the x-direction and $n_y$ is the number of the parallel shot-line and $m_1(n_x, n_y)$ is the modulating function:

$$m_1(n_x, n_y) = \frac{1}{2}[1 + (-1)^{n_x}] + \frac{1}{2}a[1 - (-1)^{n_x}] = \frac{1}{2}[1 + e^{i\pi n_x}] + \frac{1}{2}a[1 - e^{i\pi n_x}]. \quad (14)$$

The function a is a redatuming operator which is both a temporal and spatial filter [hence the convolution in space in equation (13)], which can be written in the frequency-wavenumber domain as:

$$A(\omega, k_x, k_y) = e^{ik_z \Delta z} = e^{i\sqrt{(\omega/c)^2 - k_x^2 - k_y^2} \Delta z}, \quad (15)$$

where $\Delta z = z_2 - z_1$. The action of a can then be obtained from the relation $$af(t, x, y) = \text{Re}\left(\frac{2}{(2\pi)^{3/2}} \int_0^\infty \int \int_{\mathbb{R}^2} \hat{f}(\omega, k_x, k_y) A(\omega, k_x, k_y) e^{i(\omega t + x k_x + y k_y)} d\omega dk_x dk_y\right).$$

The above equation (15) can be considered as a general example of a possible mathematical description of a redatuming operator, here in the frequency-wavenumber domain. In the frequency-wavenumber domain we obtain the following expression for the ghost wave field using capital letters for the variables in the frequency-wavenumber domain:

$$\tilde{P}^g(\omega, k_x, k_y) = \frac{1}{2}[1 + A(\omega, k_x, k_y)]P^g(\omega, k_x, k_y) + \qquad (16)$$
$$\frac{1}{2}[1 - A(\omega, k_x, k_y)]P^g(\omega, k_x - k_N, k_y),$$

which follows from a standard Fourier transform result (wavenumber shift; Bracewell, 1999).

Equation (16) shows that data from (staggered) ghost sources $\tilde{p}^g(n_x, n_y)$ will be scaled and replicated or partitioned into two places in the spectral domain. Part of the data will remain in a cone centred around k=0 with the limits of the cone defined by the slowest propagation velocity of the wave field in the medium and part of the data will be scaled and replicated or partitioned into a signal cone centered around $k_N$ along the $k_x$-axis with $k_N$ denoting the Nyquist wavenumber representing the sampling frequency of the data. In other words, part of the data will remain at the signal cone centered around k=0 (denoted by H$^+$ in FIG. 1B) and part of the data will be scaled and replicated to a signal cone centered around $k_N$ (denoted by H$^-$).

The carpet of desired (non-ghost) sources (solid black stars in FIG. 12 shown along a profile in the x-direction) with alternating depths can also be constructed from desired sources at a uniform depth $z_1$ (the level closest to the original sea surface location) through the convolution of another modulation function:

$$\tilde{p}^d(n_x, n_y) = m_2(n_x, n_y) * p^d(n_x, n_y), \qquad (17)$$

where $m_2(n_x, n_y)$ is the modulating function:

$$m_2(n_x, n_y) = \qquad (18)$$
$$\frac{1}{2}[1 + (-1)^{n_x}] + \frac{1}{2}b[1 - (-1)^{n_x}] = \frac{1}{2}[1 + e^{i\pi n_x}] + \frac{1}{2}b[1 - e^{i\pi n_x}].$$

Again, the function b is a redatuming operator in the opposite direction compared to a such that:

$$B(\omega, k_x, k_y) = A^{-1}. \qquad (19)$$

In the frequency-wavenumber domain we therefore obtain the following expression:

$$\tilde{P}^d(\omega, k_x, k_y) = \qquad (20)$$
$$\frac{1}{2}[1 + A^{-1}]P^d(\omega, k_x, k_y) + \frac{1}{2}[1 - A^{-1}]P^d(\omega, k_x - k_N, k_y).$$

Again, equation (20) shows that the data from the (staggered) desired sources $\tilde{p}^d(n_x, n_y)$ will be scaled and replicated or partitioned into two places in the spectral domain. Part of the data will remain at the signal cone centred around k=0 and part of the data will be scaled and replicated or partitioned to a signal cone centered around $k_N$ along the $k_x$-axis. In other words, part of the data will remain at the signal cone centered around k=0 (denoted by H$^+$ in FIG. 1B) and part of the data will be scaled and replicated to a signal cone centered around $k_N$ (denoted by H$^-$).

One embodiment of source deghosting uses equations (16) and (20). Equations (16) and (20) tell what the mix is of desired and ghost sources that occur around k=0 (in the following denoted by F$^0$):

$$F^0 = \frac{1}{2}[1 + A(\omega, k_x, k_y)]P^g(\omega, k_x, k_y) + \frac{1}{2}[1 + A^{-1}]P^d(\omega, k_x, k_y). \qquad (21)$$

In addition, equations (16) and (20) also tell what the mix of desired and ghost sources is that occur around $k_N$ along the $k_x$-axis (in the following denoted by F$^N$):

$$F^N = \frac{1}{2}[1 - A(\omega, k_x, k_y)]P^g(\omega, k_x, k_y) + \frac{1}{2}[1 - A^{-1}]P^d(\omega, k_x, k_y). \qquad (22)$$

Equations (21) and (22) can be combined to give an expression for the wave field of interest emitted from the desired source (i.e., the source-side deghosted wave field):

$$P^d = \frac{(1 + A)F^N - (1 - A)F^0}{(A - A^{-1})}. \qquad (23)$$

Since the operator A is known from equation (15), the deghosted wave field (i.e., the wave field of interest) can be computed explicitly.

Note that A can be determined accurately for a 3D acquisition geometry. If the cross-line spacing is coarse or if only a single line of data is acquired, it can be necessary to resort two a 2D approximation of A.

Note that in this embodiment we have not included any information about the reflection coefficient of the surface. This can be particularly advantageous for land surface seismic applications or in marine seismic applications when the sea surface reflection coefficient is unknown (e.g., due to fine scale sea surface scattering).

We can also make use of one more equation that relates the ghost sources to the desired sources:

$$P^d = -CP^g \qquad (24)$$

where C is a redatuming operator that depends on the depth of the shallow sources $z_1$ but that is related to the above defined operators A and B and knowledge or assumptions concerning the reflection coefficient of the free surface reflector, e.g. the sea surface, and is −1 in equation (24):

$$C = A^{2z_1/\Delta z}. \qquad (25)$$

Equations (16), (20), (24) and (25) therefore allow us to isolate the wave fields due to the (virtual) ghost sources and or the desired (physical) sources separately without knowing the redatuming operators A, B or C. In fact, the system of equations also allows to solve for the redatuming operator itself. Knowledge of such redatuming operators is important in many applications in seismic data processing such as in imaging of seismic data or in removing multiples in the data for instance. In this example, we obtain the following expression for the mix of desired and ghost sources that occur around k=0 (again denoted by) F$^0$):

$$F^0 = -\frac{1}{2}[1 + A]A^{-2z_1/\Delta z}P^d + \frac{1}{2}[1 + A^{-1}]P^d. \qquad (26)$$

The following expression for the mix of desired and ghost sources that occur around $k_N$ along the $k_x$-axis (again denoted by F$^N$):

$$F^N = -\frac{1}{2}[1 - A(\omega, k_x, k_y)]A^{-2z_1/\Delta z}P^d + \frac{1}{2}[1 - A^{-1}]P^d. \qquad (27)$$

Equations (26) and (27) can be solved explicitly or iteratively for arbitrary values of $z_1$ and sources $\Delta z$ such that we no longer need any information about what the redatuming operator looks like and instead can solve for the desired wave field due to the physical sources only, and or the wave field due to the (virtual) ghost sources and or the redatuming operator.

Also in the source deghosting application, for the direct deghosting by deblending to work it is required that the energy is contained in either a combination of a cone constraint such as (1) along with a condition such as $|\omega|<c/(4\Delta_x)$, or in a larger domain such as determined by (4). Again, improvements to these constraints can be obtained by various changes of coordinates and considering their effect on the deblending as shown above, and, in some cases, even by using NMO or parabolic moveout corrections without considering their effect on the deblending, but instead using the unmodified deblending expressions.

Note that the cone-shaped supports or constraints and the related diamond-shaped constraints in the frequency-wavenumber domain take on other shapes and forms in other transform domains and it should be understood when we refer to the support or the constraints as being so shaped in the fk-domain that this includes using the corresponding other shapes and forms in the other well-known transform domains as generally used in seismic data processing.

While various embodiments of the present disclosure have been described above, it should be understood that they have been presented by way of example only, and not of limitation. For example it should be noted that where filtering steps are carried out in the frequency-wavenumber space, filters with the equivalent effect can also be implemented in many other domains such as tau-p or space-time.

In addition, note that although the embodiments have focused on periodic and non-periodic variations in at least one source or source acquisition parameter, the methods described apply equally well to cases where such variations are in the receiver acquisition parameters, as can be understood by applying such principles as source-receiver reciprocity and/or invoking invariance for translation along the horizontal coordinate(s). A particular application in point is that of receiver-side deghosting.

Also note that while some of the methods and embodiments have been described and illustrated by way of two-dimensional theory, processing, data, and/or examples, they can be applied/apply equally to processing of three-dimensional data and, as can be appreciated by someone of ordinary skill in the art, can be generalised to operate with three-dimensional processing on three-dimensional data.

Further, it should be understood that the various features, aspects and functionality described in one or more of the individual embodiments are not limited in their applicability to the particular embodiment with which they are described, but instead can be applied, alone or in various combinations, to one or more of the other embodiments of the disclosure.

As should be clear to one possessing ordinary skill in the art, the methods described herein apply to different types of wave field signals recorded (simultaneously or non-simultaneously) using different types of sensors, including but not limited to; pressure and/or one or more components of the particle motion vector (where the motion can be: displacement, velocity, or acceleration) associated with compressional waves propagating in acoustic media and/or shear waves in elastic media. When multiple types of wave field signals are recorded simultaneously and are or can be assumed (or processed) to be substantially co-located, we speak of so-called "multi-component" measurements and we can refer to the measurements corresponding to each of the different types as a "component". Examples of multi-component measurements are the pressure and vertical component of particle velocity recorded by an ocean bottom cable or node-based seabed seismic sensor, the crossline and vertical component of particle acceleration recorded in a multi-sensor towed-marine seismic streamer, or the three component acceleration recorded by a microelectromechanical system (MEMS) sensor deployed e.g. in a land seismic survey.

The methods described herein can be applied to each of the measured components independently, or to two or more of the measured components jointly. Joint processing can involve processing vectorial or tensorial quantities representing or derived from the multi-component data and can be advantageous as additional features of the signals can be used in the separation. For example, it is well known in the art that particular combinations of types of measurements enable, by exploiting the physics of wave propagation, processing steps whereby e.g. the multi-component signal is separated into contributions propagating in different directions (e.g., wave field separation), certain spurious reflected waves are eliminated (e.g., deghosting), or waves with a particular (non-linear) polarization are suppressed (e.g., polarization filtering). Thus, the methods described herein can be applied in conjunction with, simultaneously with, or after such processing of two or more of the multiple components.

Furthermore, in case the obtained wave field signals consist of/comprise one or more components, then it is possible to derive local directional information from one or more of the components and to use this directional information in the reduction of aliasing effects in the separation as described herein in detail.

It is understood that the techniques, methods and systems that are disclosed herein can be applied to all marine, seabed, borehole, land and transition zone seismic surveys, that includes planning, acquisition and processing. This includes for instance time-lapse seismic, permanent reservoir monitoring, VSP and reverse VSP, and instrumented borehole surveys (e.g. distributed acoustic sensing). Moreover, the techniques, methods and systems disclosed herein can also apply to non-seismic surveys that are based on wave field data to obtain an image of the subsurface.

Figure 14:
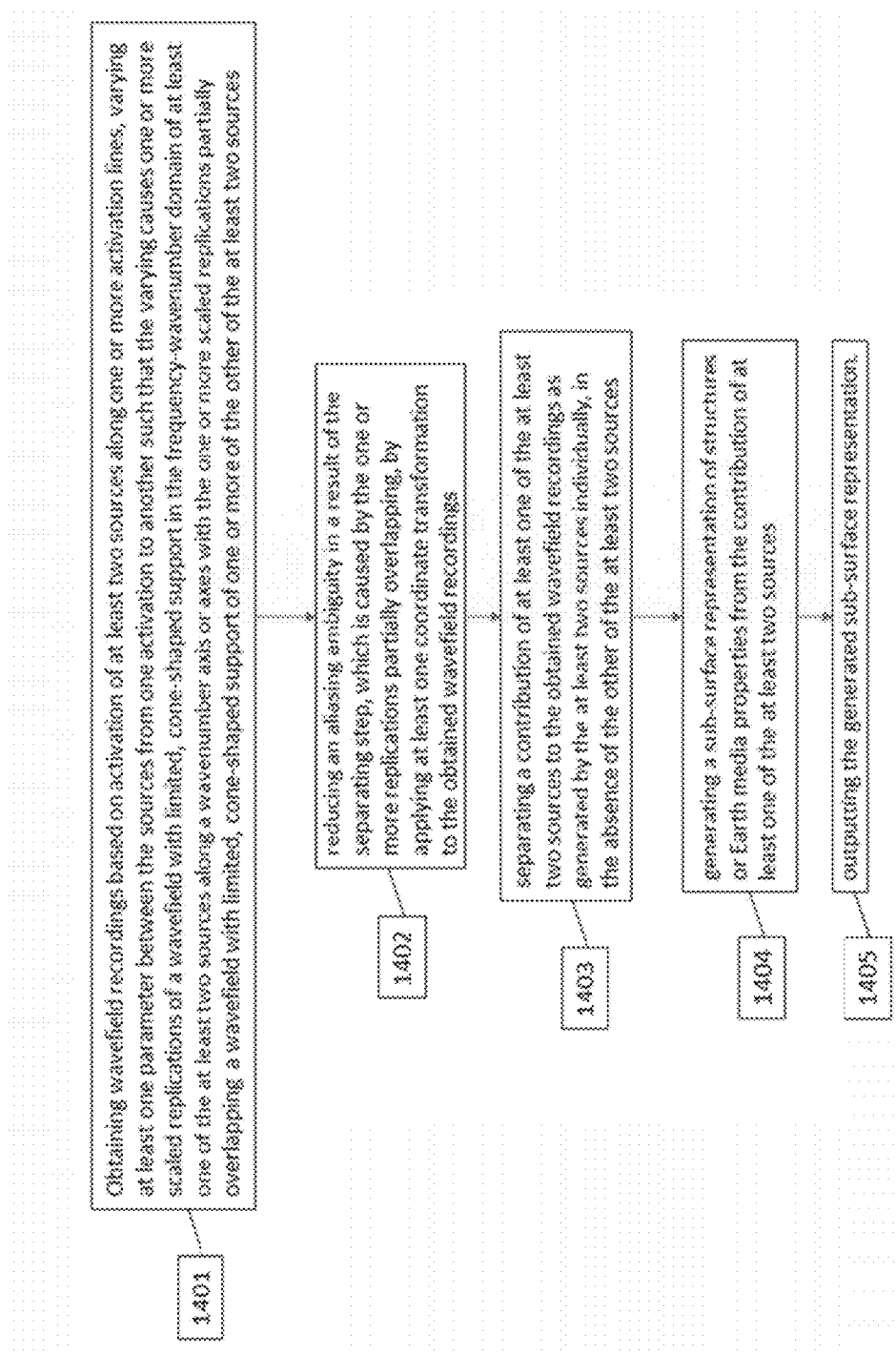
FIG. 14 summarizes key steps in the methods proposed herein in a flowchart.

In FIG. 14, the relation between key steps in the methods proposed herein is summarized. In a first step, 1401, wave field recordings are obtained based on activation of at least two sources along one or more activation lines, varying at least one parameter between the sources from one activation to another such that the varying causes one or more scaled replications of a wave field with limited, cone-shaped support in the frequency-wavenumber domain of at least one of the at least two sources along a wavenumber axis or axes with the one or more scaled replications partially overlapping a wave field with limited, cone-shaped support of one or more of the other of the at least two sources. In a second step, 1402, reducing an aliasing ambiguity in the separating step, which is caused by the one or more replications partially overlapping, is reduced by applying at least one coordinate transformation to the obtained wave field recordings. In a third step, 1403, a contribution of at least one of the at least two sources to the obtained wave field recordings as generated by the at least two sources individually, in the absence of the other of the at least two sources, is separated. In a fourth step, 1404, a sub-surface representation of structures or Earth media properties is generated from the contribution of at least one of the at least two sources. In a fifth step, 1405, the generated sub-surface representations are output.

The methods described herein can be understood as a series of logical steps and (or grouped with) corresponding numerical calculations acting on suitable digital representations of the obtained wave field quantities and hence can be implemented as computer programs or software comprising sequences of machine-readable instructions and compiled code, which, when executed on the computer produce a the intended output in a suitable digital representation. More specifically, a computer program can comprise machine-readable instructions to perform the following tasks:

Reading all or part of a suitable digital representation of the obtained wave field quantities into memory from a (local) storage medium (e.g., disk/tape), or from a (remote) network location.

Repeatedly operating on the all or part of the digital representation of the obtained wave field quantities read into memory using a central processing unit (CPU), a (general purpose) graphical processing unit (GPU), or other suitable processor. As already mentioned, such operations can be of a logical nature or of an arithmetic (i.e., computational) nature. Typically the results of many intermediate operations are temporarily held in memory or, in case of memory intensive computations, stored on disk and used for subsequent operations.

Outputting all or part of a suitable digital representation of the results produced when there no further instructions to execute by transferring the results from memory to a (local) storage medium (e.g., disk/tape) or a (remote) network location.

Computer programs can run with or without user interaction, which takes place using input and output devices such as keyboards or a mouse and display. Users can influence the program execution based on intermediate results shown on the display or by entering suitable values for parameters that are required for the program execution. For example, in one embodiment, the user could be prompted to enter information about e.g., the average inline shot point interval or source spacing. Alternatively, such information could be extracted or computed from metadata that are routinely stored with the seismic data, including for example data stored in the so-called headers of each seismic trace.

Figure 15:
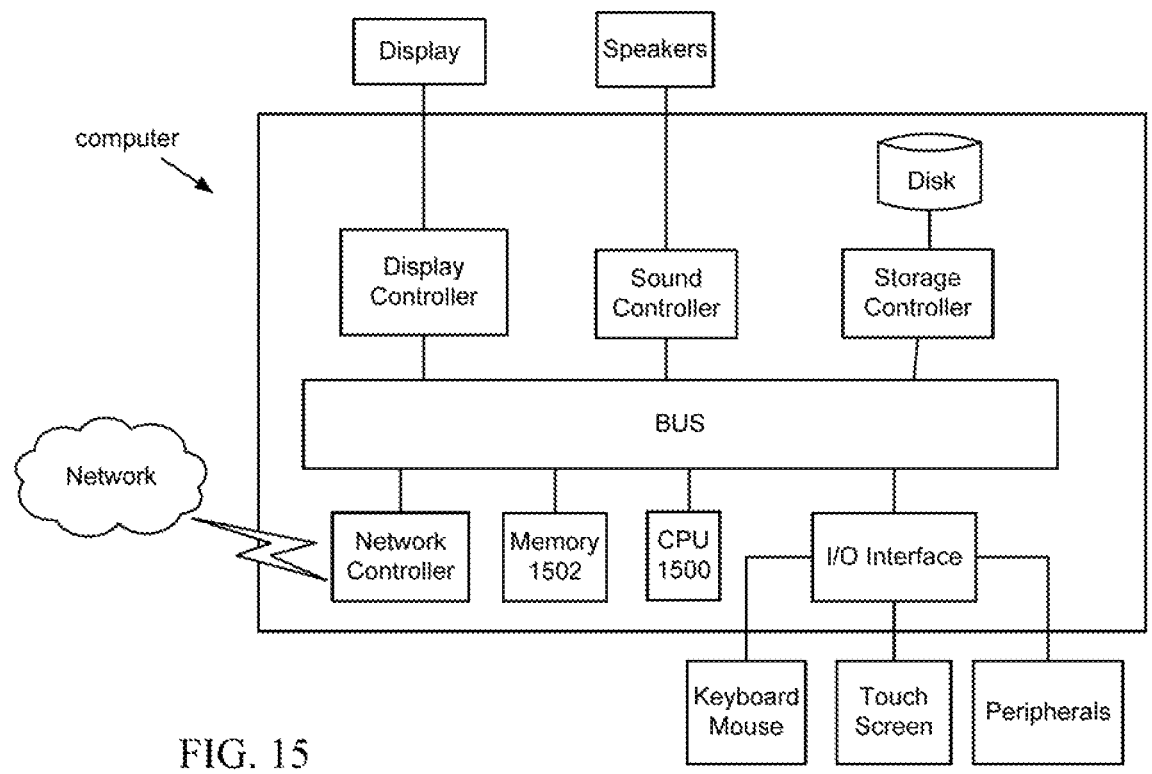
FIG. 15 illustrates hardware components of a computer.

Next, a hardware description of a computer or computers used to perform the functionality of the above-described exemplary embodiments is described with reference to FIG. 10. In FIG. 15, the computer includes a CPU 1500 (an example of "processing circuitry") that performs the processes described above. The process data and instructions may be stored in memory 1502. These processes and instructions may also be stored on a storage medium disk such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which computer communicates, such as a server or another computer.

Further, the claimed advancements may be provided as a utility application, background daemon, or component of an operating system, or combination thereof, executing in conjunction with CPU 1500 and an operating system such as Microsoft Windows 7, UNIX, Solaris, LINUX, Apple MAC-OS and other systems known to those skilled in the art.

The hardware elements in order to achieve the computer can be realized by various circuitry elements, known to those skilled in the art. For example, CPU 1500 can be a Xenon or Core processor from Intel of America or an Opteron processor from AMD of America, or may be other processor types that would be recognized by one of ordinary skill in the art. Alternatively, the CPU 1500 can be implemented on an FPGA, ASIC, PLD or using discrete logic circuits, as one of ordinary skill in the art would recognize. Further, CPU 1500 may be implemented as multiple processors cooperatively working in parallel to perform the instructions of the inventive processes described above.

LIST OF CITED REFERENCES

[Shannon, 1949] C. E. Shannon, Proc. Inst. of Radio Eng. 37, 10 (1949).

[Nyquist, 1928] H. Nyquist, Trans. AIEE. 47, 617 (1928).

[Ikelle, 2010] L. T. Ikelle, *Coding and Decoding: Seismic Data: The Concept of Multishooting.* (Elsevier, 2010), Vol. 39.

[Abma et al., 2015] R. Abma, D. Howe, M. Foster, I. Ahmed, M. Tanis, Q. Zhang, A. Arogunmati and G. Alexander, Geophysics. 80, WD37 (2015).

[Kumar et al., 2015] R. Kumar, H. Wason and F. J. Herrmann, Geophysics. 80, WD73 (2015).

[Mueller et al., 2015] M. B. Mueller, D. F. Halliday, D. J. van Manen and J. O. A. Robertsson, Geophysics. 80, V133 (2015).

[Robertsson, 2015] Robertsson, J. O. A., R. M. Laws, and J. E. Kragh, 2015, Marine seismic methods, in Resources in the near-surface Earth (eds. L. Slater and D. Bercovici), Treatise on Geophysics, 2$^{nd}$ edition (ed. G. Schubert), Elsevier-Pergamon, Oxford.

[Bracewell, 1999] R. Bracewell, *The Fourier Transform & Its Applications* (McGraw-Hill Science, 1999).

[Barnes, 1992] A. E. Barnes, GEOPHYSICS, 57(5), 749-751 (1992).

[Stockwell, 1996] R. G. Stockwell, L. Mansinha, and R. P. Lowe. Signal Processing, IEEE Transactions on 44(4), 998-1001 (1996).

[Dragoset, 1995] W. H. Dragoset. Geophysical applications of adaptive-noise cancellation. 65$^{th}$ SEG meeting, Houston, USA, Expanded Abstracts, 1389-1392.

[Trickett, 2003] S. R. Trickett, Stretch-free stacking. In 2003 SEG Annual Meeting. Society of Exploration Geophysicists.

[Zhang et al., 2012] B. Zhang, K. Zhang, S. Guo, and K. J. Marfurt, Nonstretching NMO correction of prestack time-migrated gathers using a matching-pursuit algorithm. Geophysics, 78(1), U9-U18 (2012).

The invention claimed is:

1. A method, comprising:
   obtaining wave field recordings based on activation of at least two sources along one or more activation lines, including varying at least one parameter between the sources from one activation to another, the at least one parameter being one or more of a source signal amplitude, a source signal spectrum, a source activation time, a source location at activation time, and a source depth, such that the varying causes one or more scaled replications of a wave field with limited, cone-shaped support in the frequency-wavenumber domain of at least one of the at least two sources along a wavenumber axis or axes with the one or more scaled replications partially overlapping a wave field with limited, cone-shaped support of one or more of the other of the at least two sources, with the wave field with limited cone-shaped support of the one or more of the other of the at least two sources being either not affected or replicated and scaled by the varying;

separating, by processing circuitry, a contribution of at least one of the at least two sources to the obtained wave field recordings as generated by the at least two sources individually, in the absence of the other of the at least two sources;

reducing, by the processing circuitry, an aliasing ambiguity in a result of the separating step, which is caused by the one or more replications partially overlapping, by applying at least one coordinate transformation to the obtained wave field recordings;

generating, by the processing circuitry, a sub-surface representation of structures or Earth media properties from the contribution of at least one of the at least two sources; and outputting the generated sub-surface representation.

2. The method of claim 1, wherein the coordinate transformation, when represented in the wavenumber-frequency domain, reduces the support of the scaled and replicated cone-shaped supports of the at least two sources, or an amount of energy corresponding to each source in regions of overlapping support.

3. The method of claim 1, wherein the at least one coordinate transformation imposes a bandwidth limitation in certain directions by means of directionality penalties.

4. The method of claim 1, wherein the separating step further comprises:

modelling the obtained wave field recordings using a model that incorporates the varying in the at least one parameter to relate representations of wave fields generated by the at least two sources individually in a transform domain to the model of the obtained wave field recordings, using the model, inverting the obtained wave field recordings to separate a contribution of at least one of the at least two sources to the obtained wave field recordings.

5. The method of claim 4, where the separating step includes incorporating an effect of the at least one coordinate transformation by relating coordinate-transformed representations of the wave fields to the coordinate-transformed wave field recordings.

6. The method of claim 3, wherein the at least one coordinate transformation includes computing signal energy directions of one or more of the at least two sources in the space-time domain using separated source contributions from non-overlapping parts of the obtained coordinate-transformed wave field recordings.

7. The method of claim 1, wherein the at least two sources are activated simultaneously or near-simultaneously.

8. The method of claim 1, wherein the at least one coordinate transformation is inverted to obtain a full non-coordinate-transformed signal.

9. The method of claim 1, wherein the at least one coordinate transformation is one of an NMO correction, a parabolic transform, and a local coordinate transformation representing a local directionality structure.

10. The method of claim 5, where the separating step further comprises computing an exact expression for an NMO stretch or a filter that models an effect of NMO on a modulation function associated with the varying of the at least one parameter.

11. The method of claim 1, wherein the separating step is performed in a time-varying manner after time-frequency decomposition of the coordinate-transformed wave field recordings.

12. The method of claim 9, further comprising applying simultaneously multiple NMO corrections by solving linear systems.

13. The method of claim 12 where the linear systems are solved iteratively.

14. The method of claim 1, wherein the separating step is performed in one of a Fourier transform domain, a Radon transform domain, a Gabor time-frequency domain, and a tau-p transform domain.

15. The method of claim 14, wherein operations in a domain of separation are replaced by respective representations or mathematical equivalents in corresponding transformed domains in the space or time domain.

16. The method of claim 1, wherein at least one of the at least two sources is a virtual source, and the method is applied for at least one of source-side deghosting and receiver-side deghosting.

17. The method of claim 1, further comprising at least one of estimating a redatuming operator on a source side and estimating a redatuming operator on a receiver side.

18. The method of claim 1, wherein the obtained wave field recordings include multiple components, and one or more of the multiple components is separated, and has an aliasing ambiguity reduced, using information derived from one or more of the other multiple components.

19. The method of claim 1, wherein the at least one parameter is varied in a non-periodic manner.

20. The method of claim 1, wherein the at least one parameter is varied in a non-periodic manner and is composed of a periodic part overlaid non-periodic fluctuations.

21. An apparatus, comprising:
processing circuitry configured to
obtain wave field recordings based on activation of at least two sources along one or more activation lines, including varying at least one parameter between the sources from one activation to another, the at least one parameter being one or more of a source signal amplitude, a source signal spectrum, a source activation time, a source location at activation time, and a source depth, such that the varying causes one or more scaled replications of a wave field with limited, cone-shaped support in the frequency-wavenumber domain of at least one of the at least two sources along a wavenumber axis or axes with the one or more scaled replications partially overlapping a wave field with limited, cone-shaped support of one or more of the other of the at least two sources, with the wave field with limited cone-shaped support of the one or more of the other of the at least two sources being either not affected or replicated and scaled by the varying;

separate a contribution of at least one of the at least two sources to the obtained wave field recordings as generated by the at least two sources individually, in the absence of the other of the at least two sources;

reduce an aliasing ambiguity in a result of the separating step, which is caused by the one or more replications partially overlapping, by applying at least one coordinate transformation to the obtained wave field recordings;

generate a sub-surface representation of structures or Earth media properties from the contribution of at least one of the at least two sources; and
output the generated sub-surface representation.

* * * * *